United States Patent [19]
Forrest et al.

[11] Patent Number: 5,989,147
[45] Date of Patent: Nov. 23, 1999

[54] ELECTRONICALLY CONTROLLABLE LIMITED SLIP DIFFERENTIAL

[75] Inventors: James L. Forrest, Ashley; Robert Leeper, Fort Wayne, both of Ind.

[73] Assignee: Auburn Gear, Inc., Auburn, Ind.

[21] Appl. No.: 09/030,602

[22] Filed: Feb. 25, 1998

[51] Int. Cl.$^6$ .................................................. F16H 48/22
[52] U.S. Cl. .......................................... 475/231; 475/150
[58] Field of Search ................................. 475/150, 230, 475/231, 233, 234

[56] References Cited

U.S. PATENT DOCUMENTS

| | | |
|---|---|---|
| 3,457,807 | 7/1969 | Altmann . |
| 3,987,689 | 10/1976 | Engle . |
| 4,012,968 | 3/1977 | Kelbel . |
| 4,269,086 | 5/1981 | Altmann . |
| 4,389,909 | 6/1983 | Goscenski, Jr. . |
| 4,612,825 | 9/1986 | Engle . |
| 4,662,499 | 5/1987 | Jordan . |
| 4,733,577 | 3/1988 | Griesser et al. . |
| 4,776,234 | 10/1988 | Shea . |
| 4,860,612 | 8/1989 | Dick et al. ................................. 74/665 |
| 4,876,921 | 10/1989 | Yasui et al. . |
| 5,007,886 | 4/1991 | Holmquist et al. ...................... 475/231 |
| 5,019,021 | 5/1991 | Janson . |
| 5,021,038 | 6/1991 | Beigang . |
| 5,030,181 | 7/1991 | Keller . |
| 5,037,362 | 8/1991 | Teraoka et al. . |
| 5,071,392 | 12/1991 | Stall et al. ............................... 475/150 |
| 5,092,825 | 3/1992 | Goscenscki, Jr. et al. . |
| 5,156,578 | 10/1992 | Hirota . |
| 5,226,861 | 7/1993 | Engle . |
| 5,322,484 | 6/1994 | Reuter . |
| 5,326,333 | 7/1994 | Niizawa et al. . |
| 5,556,344 | 9/1996 | Fox . |
| 5,582,557 | 12/1996 | Dissett et al. ............................ 475/231 |
| 5,759,126 | 6/1998 | Zentmyer et al. . |

OTHER PUBLICATIONS

"VISCO–LOK: A Speed Sensing Limited–Slip Device with High–Torque Progressive Engagement", SAE Technical Paper Series, No. 960718, Feb. 1996.
"Eaton Electronically Controlled Limited Slip", Eaton Corporation.
"LSD's Limited Slip Differentials", Tochigi Fuji Sangyo Kabushiki Kaisha.
"VISCO LOK Benefits/Highlights", GKN Viscodrive GmbH.
"Tech & Trends Gerodisc Slashes Cost, Weight in All–Wheel Drive", Aug. 1992.
"Disco–Tech", Automotive Industries, Jun. 1992.
"Development of the Electro–Magnetic Controlled Limited Slip Differentiall Unit (EMCD)", Tochigi Fuji Sangyo K.K.
"Eaton Automatic Locker", Eaton Corporation.

*Primary Examiner*—Dirk Wright
*Attorney, Agent, or Firm*—Baker & Daniels

[57] ABSTRACT

A controllable differential having a clutch mechanism which transfers a predetermined amount of torque between a rotatable differential casing and a side gear when an initiating force is applied by an electronic actuator. A pair of sensors provide inputs to the electronic actuator which, in turn, actuates an electromagnet. A clutch mechanism is actuated by the electromagnet and applies an initiating force to the clutch mechanism to initially actuate the clutch mechanism when a predetermined relative rotational condition of the side gears is sensed. The application of the initiating force in combination with the interaction between engagement surfaces and between camming portions fully engages a clutch mechanism to transfer a predetermined controllable amount of torque.

30 Claims, 27 Drawing Sheets

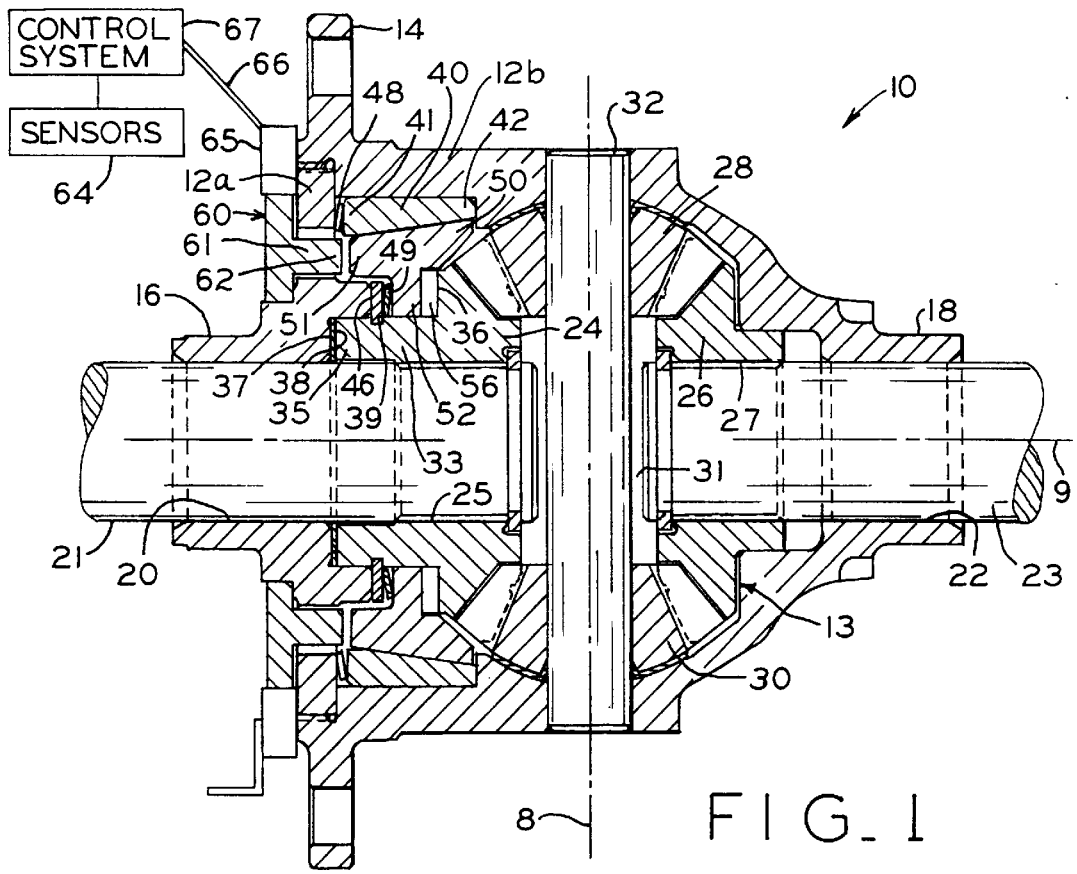
FIG_1
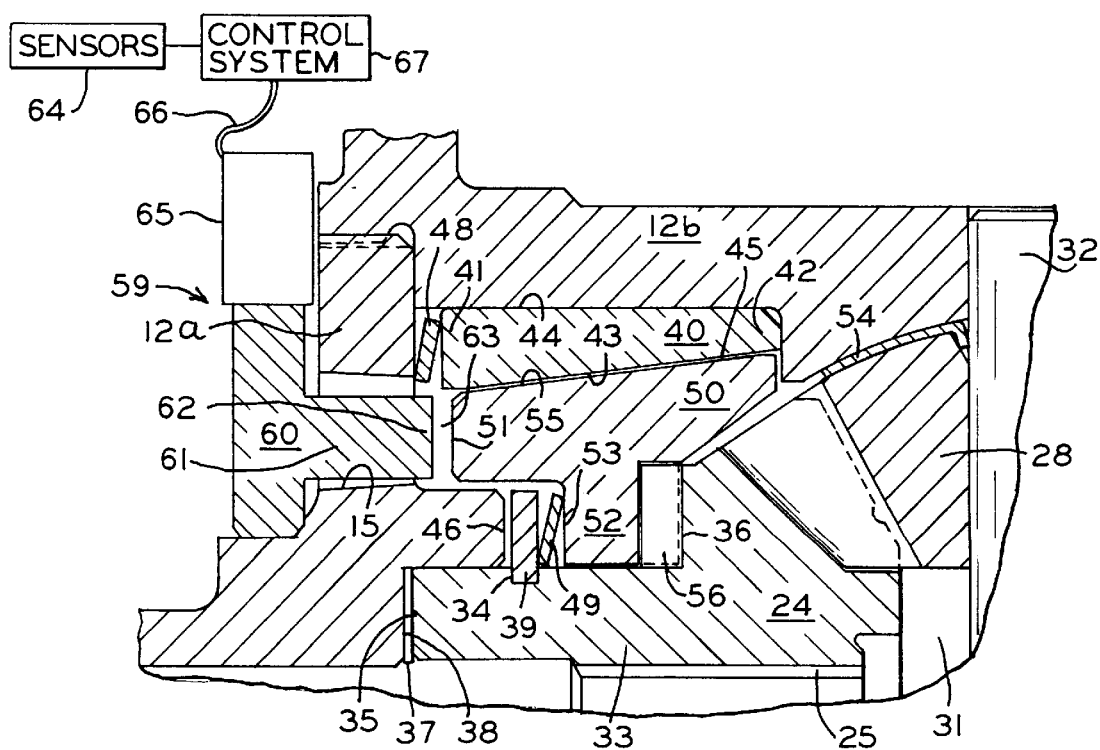
FIG_2

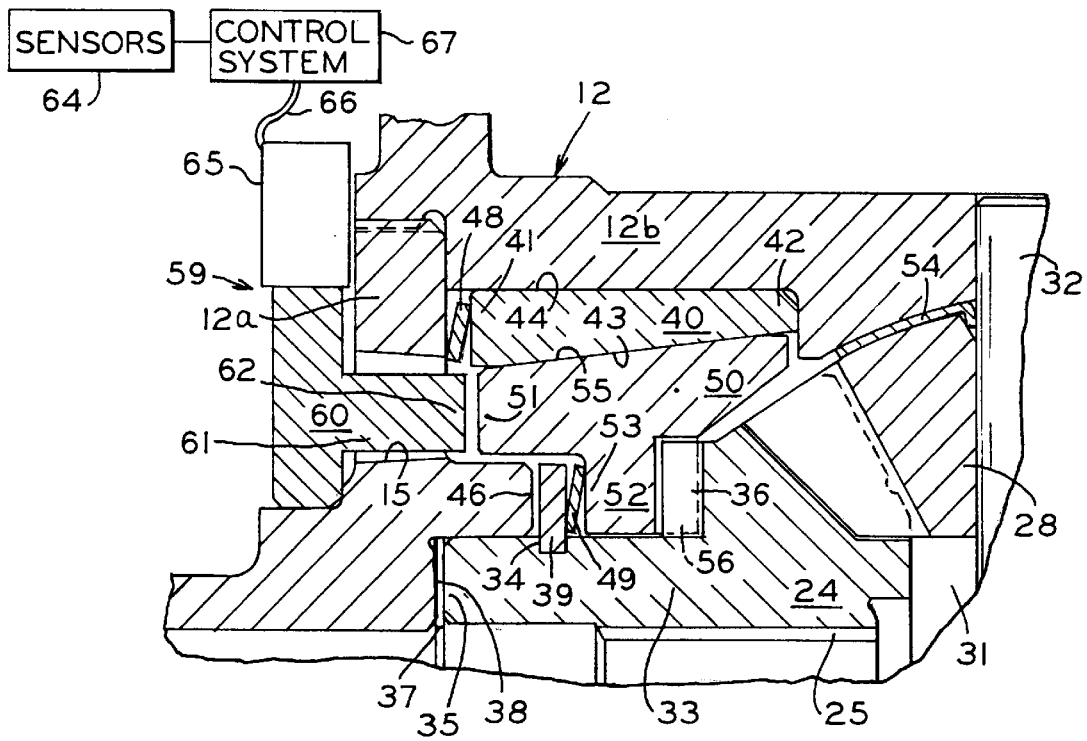
FIG_3
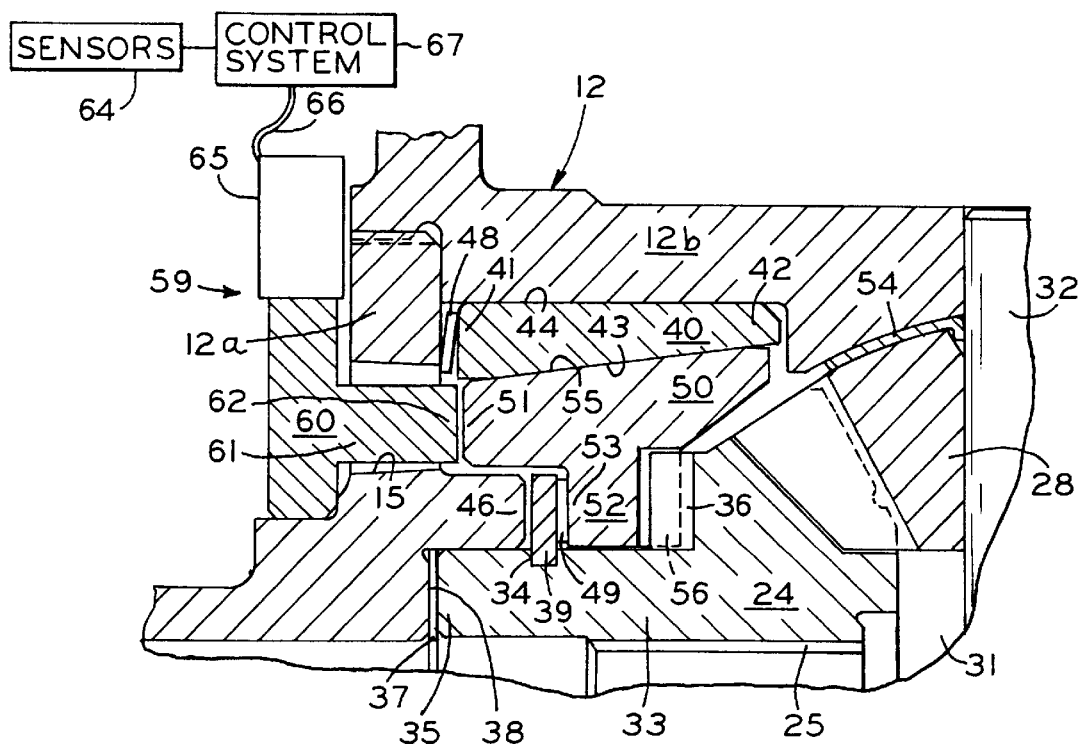
FIG_4

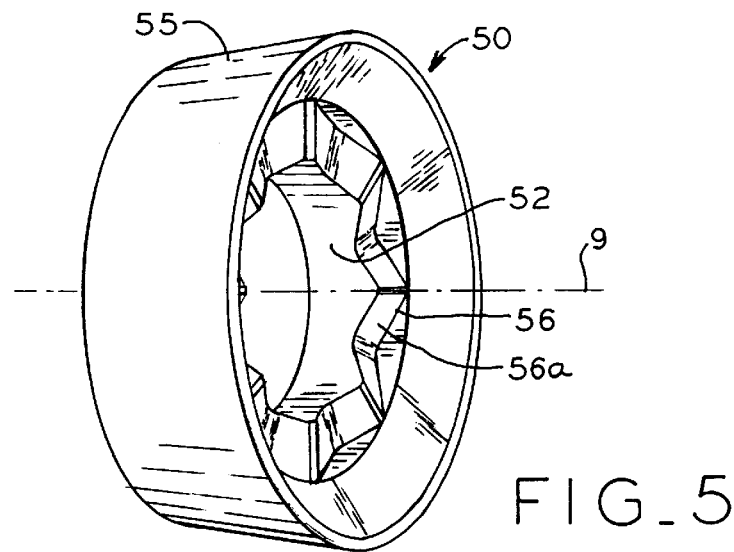
FIG_5
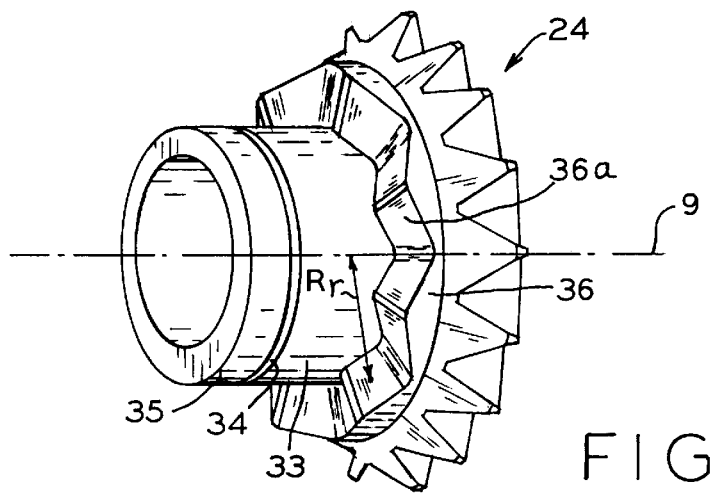
FIG_6
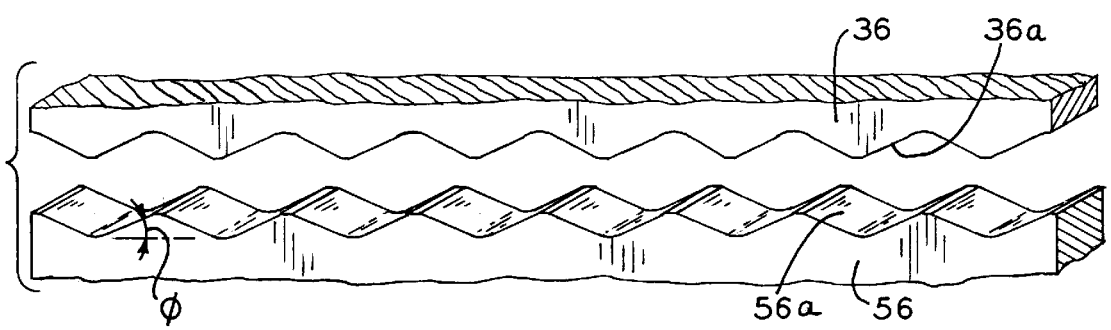
FIG_7

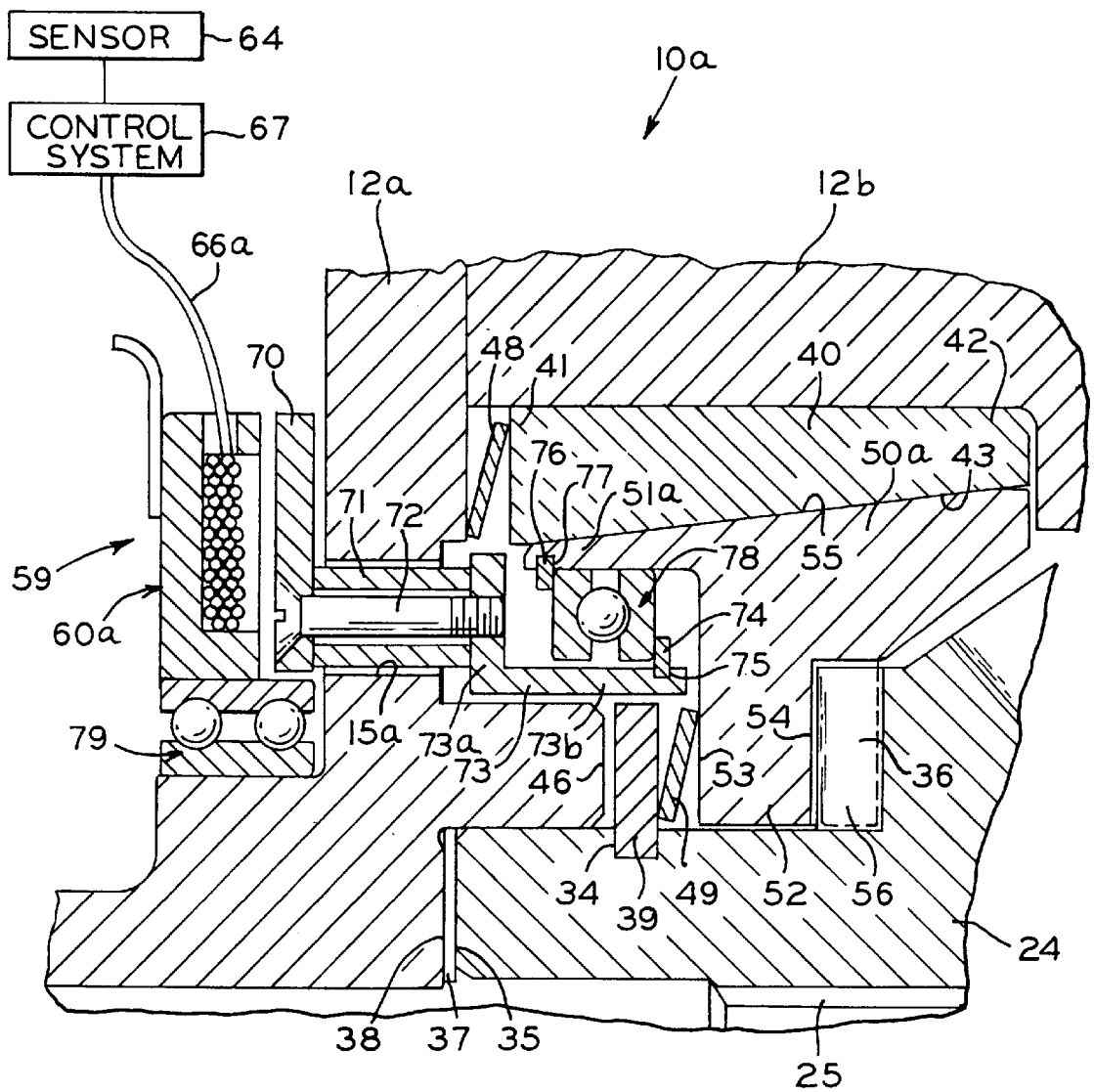
FIG_8

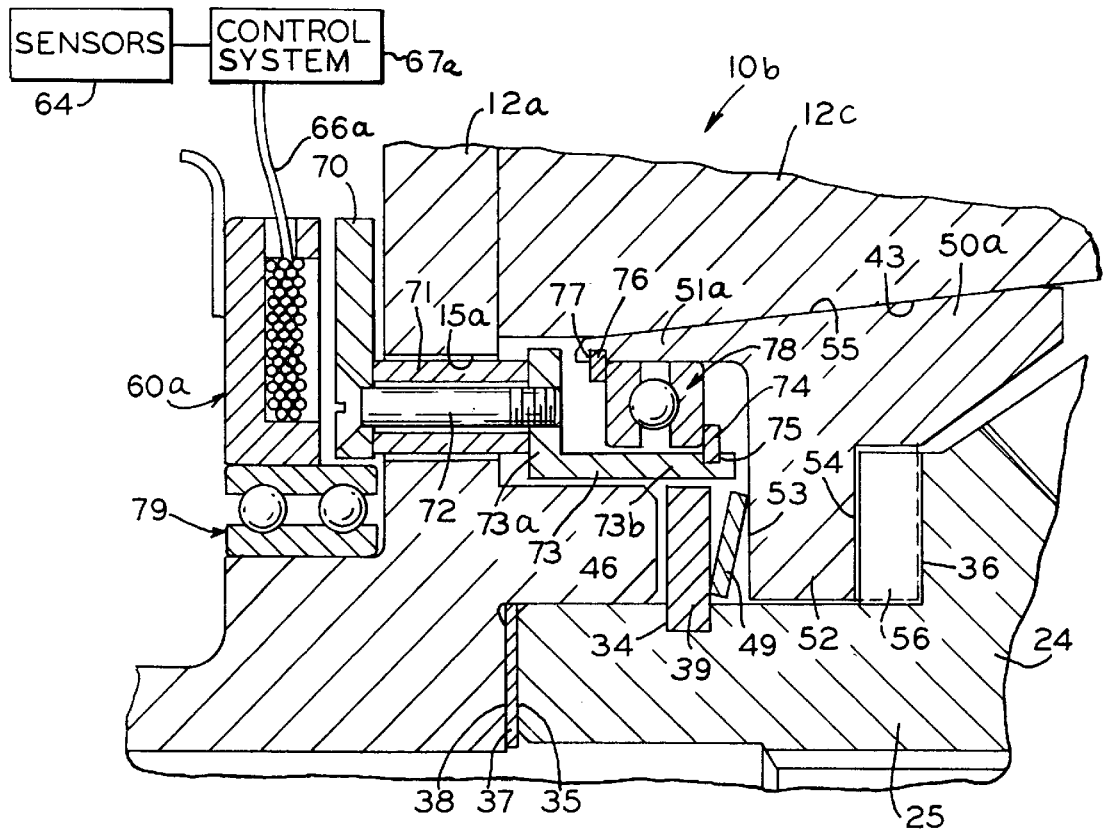
FIG_9
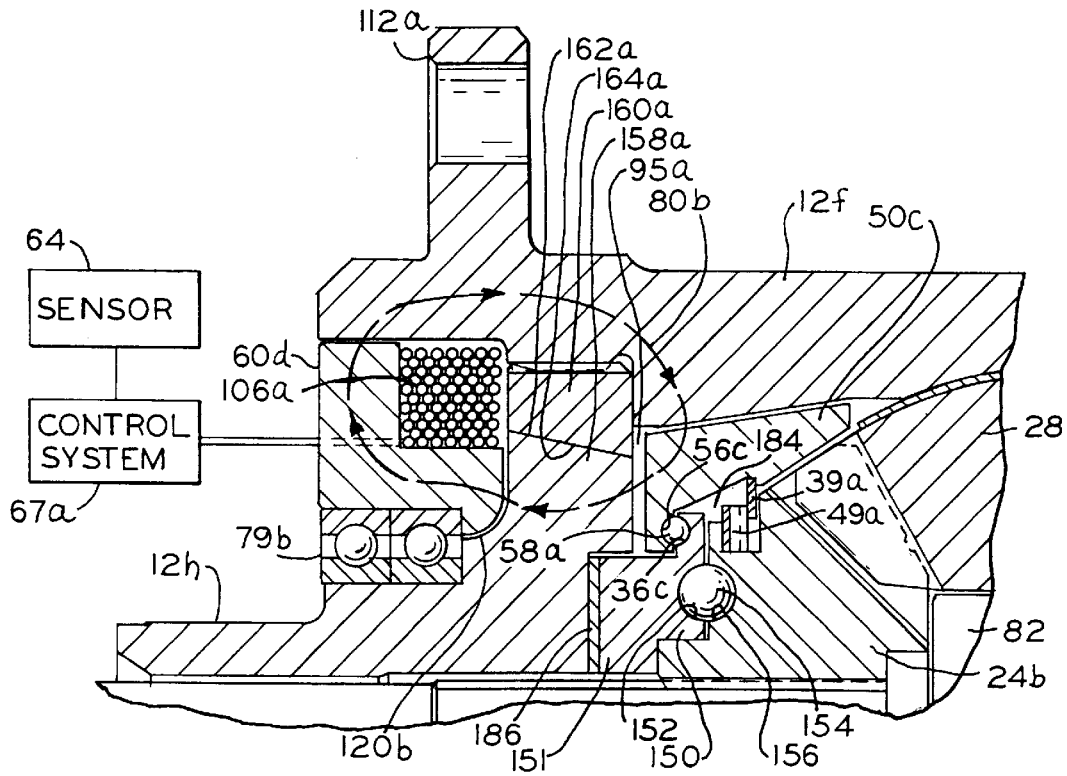
FIG_13

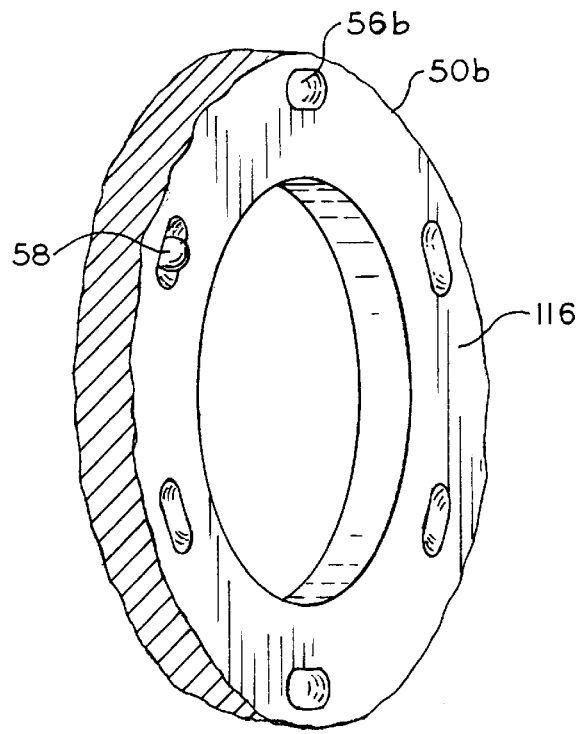
FIG_11A
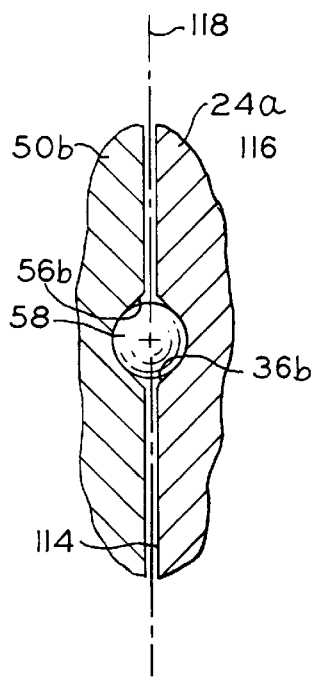
FIG_11B
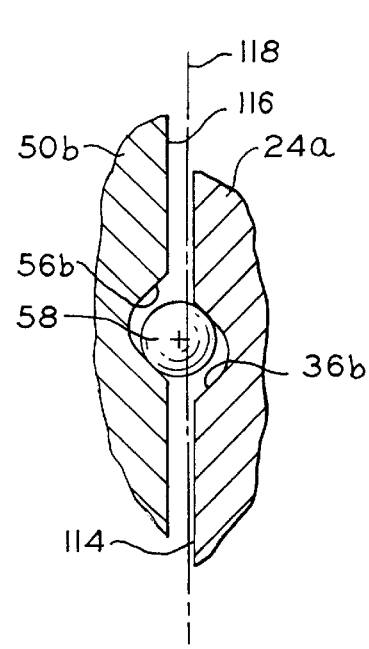
FIG_11C
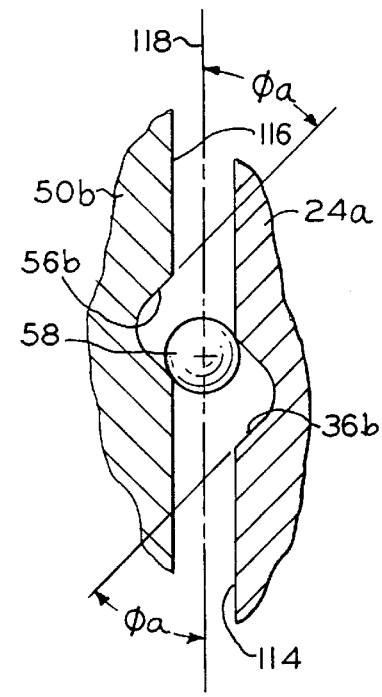
FIG_11D

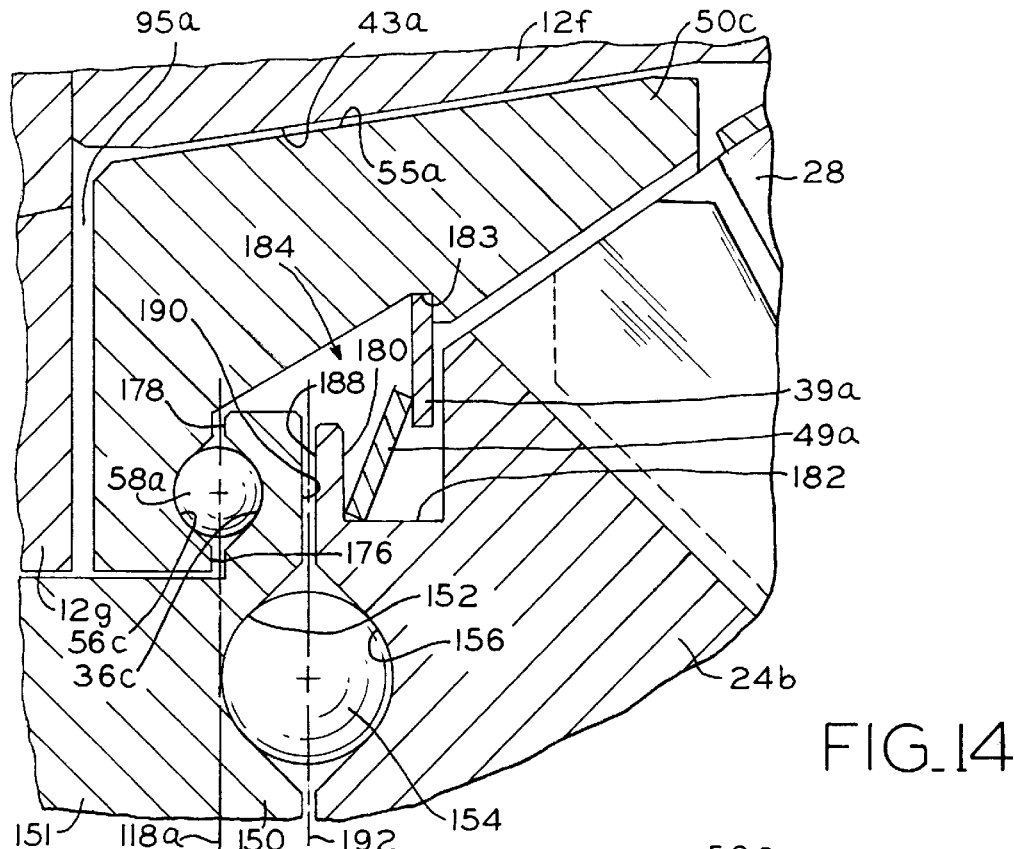
FIG_14
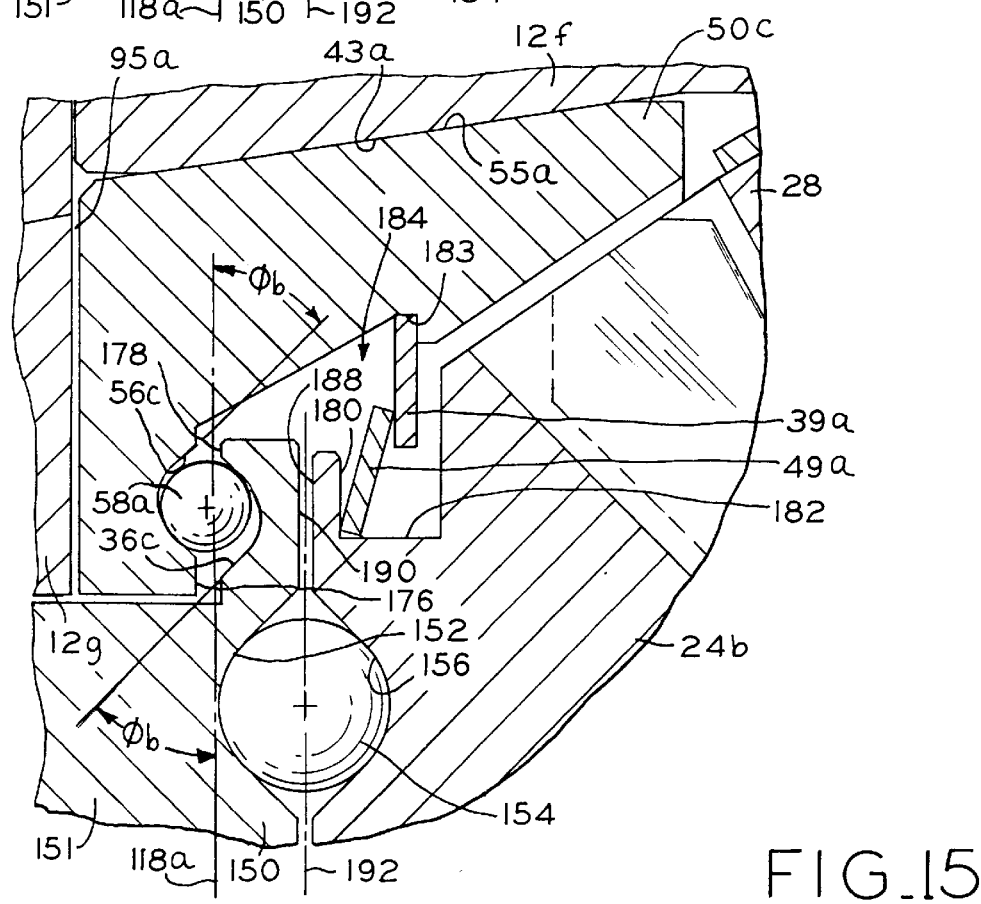
FIG_15

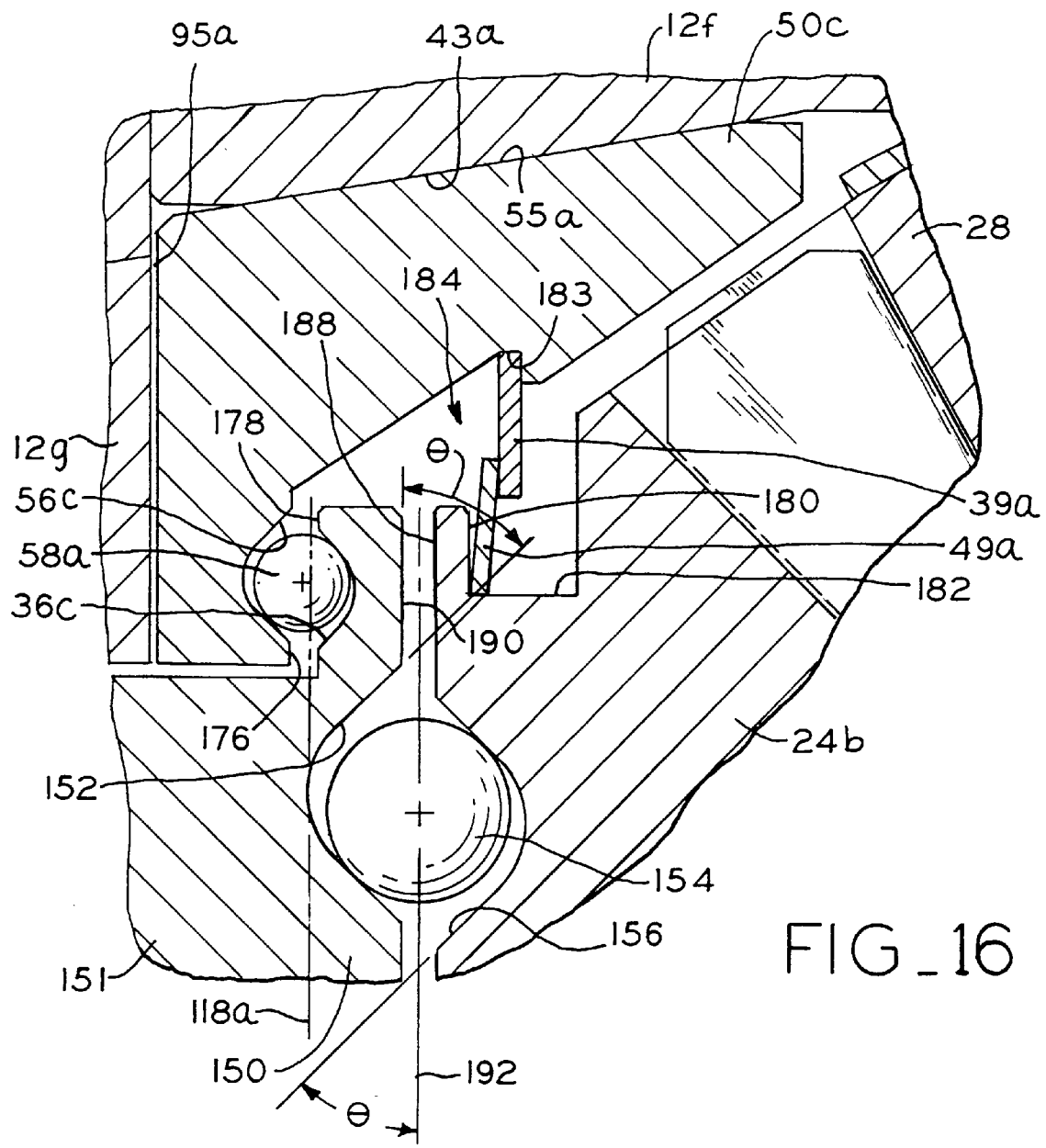

Effect of a Momentary 'Trigger Force'
On a Locking Cam/Cone Combination
$(CF \times RF > 1)$

| Clutch Cone Data | | | Cam Ramp Data | | |
|---|---|---|---|---|---|
| Coeff. of Friction $\mu$ | Cone Angle $\alpha$ | Mean Radius Rh | Coeff. of Friction $\mu$ | Cam Angle $\phi$ | Mean Radius Rh |
| 0.1 | 9 | 1.654 | 0.05 | 32 | 1.321 |

Cone Factor, CF: 1.0573    Ramp Factor, RF: 1.0867

CF X RF = 1.1489

| (Fe) EXTERNAL FORCE ON CONE | (Fc) AXIAL FORCE ON CONE | (Tc) RESULTING CONE TORQUE | (Tr) TORQUE ON CAM RAMP | (Fs) RESULTING CAM SEPARATION FORCE |
|---|---|---|---|---|
| 0 | 0.00 | 0.00 | 0.00 | 0.00 |
| 10 | 10.00 | 10.57 | 10.57 | 11.49 |
| 0 | 11.49 | 12.15 | 12.15 | 13.20 |
| 0 | 13.20 | 13.96 | 13.96 | 15.17 |
| 0 | 15.17 | 16.04 | 16.04 | 17.43 |
| 0 | 17.43 | 18.42 | 18.42 | 20.02 |
| 0 | 20.02 | 21.17 | 21.17 | 23.00 |
| 0 | 23.00 | 24.32 | 24.32 | 26.43 |
| 0 | 26.43 | 27.94 | 27.94 | 30.36 |
| 0 | 30.36 | 32.10 | 32.10 | 34.89 |
| 0 | 34.89 | 36.89 | 36.89 | 40.08 |
| 0 | 40.08 | 42.38 | 42.38 | 46.05 |
| 0 | 46.05 | 48.69 | 48.69 | 52.91 |

FIG. 17A

| (Fe) EXTERNAL FORCE ON CONE | (Fc) AXIAL FORCE ON CONE | (Tc) RESULTING CONE TORQUE | (Tr) TORQUE ON CAM RAMP | (Fs) RESULTING CAM SEPARATION FORCE |
|---|---|---|---|---|
| 0 | 52.91 | 55.94 | 55.94 | 60.79 |
| 0 | 60.79 | 64.27 | 64.27 | 69.84 |
| 0 | 69.84 | 73.85 | 73.85 | 80.25 |
| 0 | 80.25 | 84.85 | 84.85 | 92.20 |
| 0 | 92.20 | 97.48 | 97.48 | 105.93 |
| 0 | 105.93 | 112.00 | 112.00 | 121.71 |
| 0 | 121.71 | 128.68 | 128.68 | 139.83 |
| 0 | 139.83 | 147.85 | 147.85 | 160.66 |
| 0 | 160.66 | 169.87 | 169.87 | 184.59 |
| 0 | 184.59 | 195.17 | 195.17 | 212.08 |
| 0 | 212.08 | 224.23 | 224.23 | 243.66 |
| 0 | 243.66 | 257.63 | 257.63 | 279.95 |
| 0 | 279.95 | 296.00 | 296.00 | 321.65 |
| 0 | 321.65 | 340.08 | 340.08 | 369.55 |
| 0 | 369.55 | 390.73 | 390.73 | 424.59 |
| 0 | 424.59 | 448.92 | 448.92 | 487.83 |
| 0 | 487.83 | 515.78 | 515.78 | 560.48 |
| 0 | 560.48 | 592.60 | 592.60 | 643.96 |
| 0 | 643.96 | 680.86 | 680.86 | 739.86 |
| 0 | 739.86 | 782.26 | 782.26 | 850.05 |
| 0 | 850.05 | 898.77 | 898.77 | 976.65 |
| 0 | 976.65 | 1032.63 | 1032.63 | 1122.11 |

FIG. 17B

| (Fe) EXTERNAL FORCE ON CONE | (Fc) AXIAL FORCE ON CONE | (Tc) RESULTING CONE TORQUE | (Tr) TORQUE ON CAM RAMP | (Fs) RESULTING CAM SEPARATION FORCE |
|---|---|---|---|---|
| 0 | 1122.11 | 1186.42 | 1186.42 | 1289.23 |
| 0 | 1289.23 | 1363.12 | 1363.12 | 1481.24 |
| 0 | 1481.24 | 1566.14 | 1566.14 | 1701.85 |
| 0 | 1701.85 | 1799.39 | 1799.39 | 1955.32 |
| 0 | 1955.32 | 2067.38 | 2067.38 | 2246.53 |
| 0 | 2246.53 | 2375.28 | 2375.28 | 2581.12 |
| 0 | 2581.12 | 2729.04 | 2729.04 | 2965.53 |
| 0 | 2965.53 | 3135.49 | 3135.49 | 3407.20 |
| 0 | 3407.20 | 3602.47 | 3602.47 | 3914.65 |

FIG- 17C

Effect of a 'Sustained Force'
On a Locking Cam/Cone Combination
(CF X RF > 1)

| Clutch Cone Data | | | | Cam Ramp Data | | |
|---|---|---|---|---|---|---|
| Coeff. of Friction μ | Cone Angle α | Mean Radius Rn | | Coeff. of Friction μ | Cam Angle φ | Mean Radius Rn |
| 0.1 | 9 | 1.654 | | 0.05 | 32 | 1.321 |

Cone Factor, CF: 1.0573
Ramp Factor, RF: 1.0867
CF X RF = 1.1489

| (Fe) EXTERNAL FORCE ON CONE | (Fc) AXIAL FORCE ON CONE | (Tc) RESULTING CONE TORQUE | (Tr) TORQUE ON CAM RAMP | (Fs) RESULTING CAM SEPARATION FORCE |
|---|---|---|---|---|
| 0 | 0.00 | 0.00 | 0.00 | 0.00 |
| 10 | 10.00 | 10.57 | 10.57 | 11.49 |
| 10 | 21.49 | 22.72 | 22.72 | 24.69 |
| 10 | 34.69 | 36.68 | 36.68 | 39.86 |
| 10 | 49.86 | 52.71 | 52.71 | 57.28 |
| 10 | 67.28 | 71.14 | 71.14 | 77.30 |
| 10 | 87.30 | 92.31 | 92.31 | 100.30 |
| 10 | 110.30 | 116.63 | 116.63 | 126.73 |
| 10 | 136.73 | 144.57 | 144.57 | 157.10 |
| 10 | 167.10 | 176.67 | 176.67 | 191.98 |
| 10 | 201.98 | 213.56 | 213.56 | 232.07 |
| 10 | 242.07 | 255.94 | 255.94 | 278.12 |
| 10 | 288.12 | 304.63 | 304.63 | 331.03 |

FIG. 19A

| (Fe) EXTERNAL FORCE ON CONE | (Fc) AXIAL FORCE ON CONE | (Tc) RESULTING CONE TORQUE | (Tr) TORQUE ON CAM RAMP | (Fs) RESULTING CAM SEPARATION FORCE |
|---|---|---|---|---|
| 10 | 341.03 | 360.57 | 360.57 | 391.82 |
| 10 | 401.82 | 424.85 | 424.85 | 461.66 |
| 10 | 471.66 | 498.69 | 498.69 | 541.91 |
| 10 | 551.91 | 583.54 | 583.54 | 634.11 |
| 10 | 644.11 | 681.02 | 681.02 | 740.04 |
| 10 | 750.04 | 793.02 | 793.02 | 861.74 |
| 10 | 871.74 | 921.71 | 921.71 | 1001.58 |
| 10 | 1011.58 | 1069.55 | 1069.55 | 1162.24 |
| 10 | 1172.24 | 1239.42 | 1239.42 | 1346.82 |
| 10 | 1356.82 | 1434.58 | 1434.58 | 1558.90 |
| 10 | 1568.90 | 1658.82 | 1658.82 | 1802.56 |
| 10 | 1812.56 | 1916.44 | 1916.44 | 2082.51 |
| 10 | 2092.51 | 2212.44 | 2212.44 | 2404.16 |
| 10 | 2414.16 | 2552.52 | 2552.52 | 2773.71 |
| 10 | 2783.71 | 2943.25 | 2943.25 | 3198.30 |
| 10 | 3208.30 | 3392.18 | 3392.18 | 3686.13 |
| 10 | 3696.13 | 3907.96 | 3907.96 | 4246.61 |
| 10 | 4256.61 | 4500.56 | 4500.56 | 4890.56 |
| 10 | 4900.56 | 5181.42 | 5181.42 | 5630.43 |
| 10 | 5640.43 | 5963.69 | 5963.69 | 6480.48 |
| 10 | 6490.48 | 6862.46 | 6862.46 | 7457.13 |
| 10 | 7467.13 | 7895.09 | 7895.09 | 8579.25 |

Fig. 19B

| (Fe) EXTERNAL FORCE ON CONE | (Fc) AXIAL FORCE ON CONE | (Tc) RESULTING CONE TORQUE | (Tr) TORQUE ON CAM RAMP | (Fs) RESULTING CAM SEPARATION FORCE |
|---|---|---|---|---|
| 10 | 8589.25 | 9081.51 | 9081.51 | 9868.48 |
| 10 | 9878.48 | 10444.63 | 10444.63 | 11349.72 |
| 10 | 11359.72 | 12010.77 | 12010.77 | 13051.58 |
| 10 | 13061.58 | 13810.16 | 13810.16 | 15006.89 |
| 10 | 15016.89 | 15877.54 | 15877.54 | 17253.42 |
| 10 | 17263.42 | 18252.82 | 18252.82 | 19834.54 |
| 10 | 19844.54 | 20981.86 | 20981.86 | 22800.07 |
| 10 | 22810.07 | 24117.35 | 24117.35 | 26207.27 |
| 10 | 26217.27 | 27719.83 | 27719.83 | 30121.92 |

FIG. 19C

Effect of a Monentary 'Trigger Force'
On a Non-Locking Cam/Cone Combination
(CF X RF < 1)

| Clutch Cone Data | | | Can Ramp Data | | |
|---|---|---|---|---|---|
| Coeff. of Friction $\mu$ | Cone Angle $\alpha$ | Mean Radius Rn | Coeff. of Friction $\mu$ | Can Angle $\phi$ | Mean Radius Rn |
| 0.1 | 9 | 1.654 | 0.05 | 46 | 1.321 |

Cone Factor, CF:  1.0573
Ramp Factor, RF:  0.6613
CF X RF =  0.6991

| (Fe) EXTERNAL FORCE ON CONE | (Fc) AXIAL FORCE ON CONE | (Tc) RESULTING CONE TORQUE | (Tr) TORQUE ON CAM RAMP | (Fs) RESULTING CAM SEPARATION FORCE |
|---|---|---|---|---|
| 0 | 0.00 | 0.00 | 0.00 | 0.00 |
| 10 | 10.00 | 10.57 | 10.57 | 6.99 |
| 0 | 6.99 | 7.39 | 7.39 | 4.89 |
| 0 | 4.89 | 5.17 | 5.17 | 3.42 |
| 0 | 3.42 | 3.61 | 3.61 | 2.39 |
| 0 | 2.39 | 2.53 | 2.53 | 1.67 |
| 0 | 1.67 | 1.77 | 1.77 | 1.17 |
| 0 | 1.17 | 1.23 | 1.23 | 0.82 |
| 0 | 0.82 | 0.86 | 0.86 | 0.57 |
| 0 | 0.57 | 0.60 | 0.60 | 0.40 |
| 0 | 0.40 | 0.42 | 0.42 | 0.28 |
| 0 | 0.28 | 0.30 | 0.30 | 0.20 |
| 0 | 0.20 | 0.21 | 0.21 | 0.14 |

FIG. 21A

| (Fe) EXTERNAL FORCE ON CONE | (Fc) AXIAL FORCE ON CONE | (Tc) RESULTING CONE TORQUE | (Tr) TORQUE ON CAM RAMP | (Fs) RESULTING CAM SEPARATION FORCE |
|---|---|---|---|---|
| 0 | 0.14 | 0.14 | 0.14 | 0.10 |
| 0 | 0.10 | 0.10 | 0.10 | 0.07 |
| 0 | 0.07 | 0.07 | 0.07 | 0.05 |
| 0 | 0.05 | 0.05 | 0.05 | 0.03 |
| 0 | 0.03 | 0.03 | 0.03 | 0.02 |
| 0 | 0.02 | 0.02 | 0.02 | 0.02 |
| 0 | 0.02 | 0.02 | 0.02 | 0.01 |
| 0 | 0.01 | 0.01 | 0.01 | 0.01 |
| 0 | 0.01 | 0.01 | 0.01 | 0.00 |
| 0 | 0.01 | 0.00 | 0.00 | 0.00 |
| 0 | 0.00 | 0.00 | 0.00 | 0.00 |
| 0 | 0.00 | 0.00 | 0.00 | 0.00 |
| 0 | 0.00 | 0.00 | 0.00 | 0.00 |
| 0 | 0.00 | 0.00 | 0.00 | 0.00 |
| 0 | 0.00 | 0.00 | 0.00 | 0.00 |
| 0 | 0.00 | 0.00 | 0.00 | 0.00 |
| 0 | 0.00 | 0.00 | 0.00 | 0.00 |
| 0 | 0.00 | 0.00 | 0.00 | 0.00 |
| 0 | 0.00 | 0.00 | 0.00 | 0.00 |

FIG. 21B

| (Fe) EXTERNAL FORCE ON CONE | (Fc) AXIAL FORCE ON CONE | (Tc) RESULTING CONE TORQUE | (Tr) TORQUE ON CAM RAMP | (Fs) RESULTING CAM SEPARATION FORCE |
|---|---|---|---|---|
| 0 | 0.00 | 0.00 | 0.00 | 0.00 |
| 0 | 0.00 | 0.00 | 0.00 | 0.00 |
| 0 | 0.00 | 0.00 | 0.00 | 0.00 |
| 0 | 0.00 | 0.00 | 0.00 | 0.00 |
| 0 | 0.00 | 0.00 | 0.00 | 0.00 |
| 0 | 0.00 | 0.00 | 0.00 | 0.00 |
| 0 | 0.00 | 0.00 | 0.00 | 0.00 |
| 0 | 0.00 | 0.00 | 0.00 | 0.00 |

FIG. 21C

Effect of a 'Sustained Force'
On a Non-Locking Cam/Cone Combination
(CF X RF < 1)

| Clutch Cone Data | | | Cam Ramp Data | | |
|---|---|---|---|---|---|
| Coeff. of Friction $\mu$ | Cone Angle $\alpha$ | Mean Radius $R_n$ | Coeff. of Friction $\mu$ | Cam Angle $\phi$ | Mean Radius $R_m$ |
| 0.1 | 9 | 1.654 | 0.05 | 46 | 1.321 |

Cone Factor, CF: 1.0573    Ramp Factor, RF: 0.6613

CF X RF = 0.6991

| $(F_e)$ EXTERNAL FORCE ON CONE | $(F_c)$ AXIAL FORCE ON CONE | $(T_c)$ RESULTING CONE TORQUE | $(T_r)$ TORQUE ON CAM RAMP | $(F_s)$ RESULTING CAM SEPARATION FORCE |
|---|---|---|---|---|
| 0  | 0.00  | 0.00  | 0.00  | 0.00 |
| 10 | 10.00 | 10.57 | 10.57 | 6.99 |
| 10 | 16.99 | 17.97 | 17.97 | 11.88 |
| 10 | 21.88 | 23.13 | 23.13 | 15.30 |
| 10 | 25.30 | 26.75 | 26.75 | 17.69 |
| 10 | 27.69 | 29.27 | 29.27 | 19.36 |
| 10 | 29.36 | 31.04 | 31.04 | 20.52 |
| 10 | 30.52 | 32.27 | 32.27 | 21.34 |
| 10 | 31.34 | 33.14 | 33.14 | 21.91 |
| 10 | 31.91 | 33.74 | 33.74 | 22.31 |
| 10 | 32.31 | 34.16 | 34.16 | 22.59 |
| 10 | 32.59 | 34.46 | 34.46 | 22.79 |
| 10 | 32.79 | 34.66 | 34.66 | 22.92 |

FIG. 23A

| (Fe) EXTERNAL FORCE ON CONE | (Fc) AXIAL FORCE ON CONE | (Tc) RESULTING CONE TORQUE | (Tr) TORQUE ON CAM RAMP | (Fs) RESULTING CAM SEPARATION FORCE |
|---|---|---|---|---|
| 10 | 32.92 | 34.81 | 34.81 | 23.02 |
| 10 | 33.02 | 34.91 | 34.91 | 23.08 |
| 10 | 33.08 | 34.98 | 34.98 | 23.13 |
| 10 | 33.13 | 35.03 | 35.03 | 23.16 |
| 10 | 33.16 | 35.06 | 35.06 | 23.19 |
| 10 | 33.19 | 35.09 | 35.09 | 23.20 |
| 10 | 33.20 | 35.10 | 35.10 | 23.21 |
| 10 | 33.21 | 35.12 | 35.12 | 23.22 |
| 10 | 33.22 | 35.12 | 35.12 | 23.23 |
| 10 | 33.23 | 35.13 | 35.13 | 23.23 |
| 10 | 33.23 | 35.13 | 35.13 | 23.23 |
| 10 | 33.23 | 35.14 | 35.14 | 23.23 |
| 10 | 33.24 | 35.14 | 35.14 | 23.24 |
| 10 | 33.24 | 35.14 | 35.14 | 23.24 |
| 10 | 33.24 | 35.14 | 35.14 | 23.24 |
| 10 | 33.24 | 35.14 | 35.14 | 23.24 |
| 10 | 33.24 | 35.14 | 35.14 | 23.24 |
| 10 | 33.24 | 35.14 | 35.14 | 23.24 |
| 10 | 33.24 | 35.14 | 35.14 | 23.24 |
| 10 | 33.24 | 35.14 | 35.14 | 23.24 |

FIG. 23B

| (Fe) EXTERNAL FORCE ON CONE | (Fc) AXIAL FORCE ON CONE | (Tc) RESULTING CONE TORQUE | (Tr) TORQUE ON CAM RAMP | (Fs) RESULTING CAM SEPARATION FORCE |
|---|---|---|---|---|
| 10 | 33.24 | 35.14 | 35.14 | 23.24 |
| 10 | 33.24 | 35.14 | 35.14 | 23.24 |
| 10 | 33.24 | 35.14 | 35.14 | 23.24 |
| 10 | 33.24 | 35.14 | 35.14 | 23.24 |
| 10 | 33.24 | 35.14 | 35.14 | 23.24 |
| 10 | 33.24 | 35.14 | 35.14 | 23.24 |
| 10 | 33.24 | 35.14 | 35.14 | 23.24 |
| 10 | 33.24 | 35.14 | 35.14 | 23.24 |

FIG. 23C

ELECTRONICALLY CONTROLLABLE LIMITED SLIP DIFFERENTIAL

BACKGROUND OF THE INVENTION

1. Field of the Invention

The present invention relates to differentials, and more particularly, to traction enhancing differentials.

2. Description of the Related Art

Differentials are well known in the prior art and allow a pair of output shafts operatively coupled to an input shaft to rotate at different speeds, thereby allowing the wheel associated with each output shaft to maintain traction with the road while the vehicle is turning. Such a device essentially distributes the torque provided by the input shaft between the output shafts. However, the necessity for a differential which limits the differential rotation between the output shafts to provide traction on slippery surfaces is well known.

The completely open differential, i.e. a differential without clutches or springs, is unsuitable in slippery conditions where one wheel experiences a much lower coefficient of friction than the other wheel, for instance, when one wheel of a vehicle is located on a patch of ice and the other wheel is on dry pavement. In such a condition, the wheel experiencing the lower coefficient of friction loses traction and a small amount of torque to that wheel will cause a "spin out" of that wheel. Since the maximum amount of torque which can be developed on the wheel with traction is equal to torque on the wheel without traction, i.e. the slipping wheel, the engine is unable to develop any torque and the wheel with traction is unable to rotate. A number of methods have been developed to limit wheel slippage under such conditions.

Prior methods of limiting slippage between the side gears and the differential casing use a frictional clutch mechanism, either clutch plates or a frustoconical engagement structure, and a bias mechanism, usually a spring, to apply an initial preload between the side gears and the differential casing. By using a frictional clutch with an initial preload, for example a spring, a minimum amount of torque can always be applied to the wheel having traction, i.e. the wheel located on dry pavement. The initial torque generates gear separating forces which further engage the frictional clutch and develop additional torque. Examples of such limited slip differentials are disclosed in U.S. Pat. Nos. 4,612,825 (Engle), 5,226,861 (Engle) and 5,556,344 (Fox), which are assigned to the assignee of the present invention and expressly incorporated herein by reference.

The initial preload initiates the development of side gear separating forces which provide further braking action between the side gears and the differential casing. In general, gear separating forces are forces induced on any set of meshing gears by the application of torque to the gears and tend to separate the gears. In a differential, the development of torque will create side gear separating forces which tend to move the side gears away from the pinion gears. When one wheel is on a surface having a low coefficient of friction, the initial preload creates some contact and frictional engagement between the differential casing and the clutch mechanism disposed between the side gears and the differential casing to allow the engine to provide torque to the wheel having traction. This initial torque transfer induces gear separating forces on the side gears which tend to separate the side gears to further frictionally engage the clutch mechanism with the casing. The increased frictional engagement of the clutch allows more torque to be developed, thus further increasing the side gear separating forces and limiting the slippage between the side gears and the differential casing.

However, such preloaded clutches are usually always engaged, and thus are susceptible to wear, causing undesirable repair and replacement costs. Additionally, such clutch mechanisms usually employ spring mechanisms which add to the cost and difficulty of manufacture.

Additionally, such a preloaded clutch mechanism may lock the output shafts together in situations where differential rotation is necessary. For example, if the vehicle is making a turn when the wheels are sufficiently engaged on the road surface and a sufficient amount of torque is developed, the differential will tend to lock up the output shafts due to the action of the side gear separating forces created by the developed torque. This may occur, for example, during turns on surfaces with a high coefficient of friction while under acceleration. In such a case, even though differential rotation is required, the torque and side gear separating forces lock up the two output shafts causing one wheel to drag and slide along the road surface. This problem is evident in rear drive vehicles during turns under acceleration as the portion of the vehicle near the dragging wheel may tend to bounce up and down.

Another method of limiting slippage involves engaging a frictional clutch mechanism between the side gears and the differential casing based on the difference in rotational speeds between the two output shafts. Limited slip differentials employing this method are classified as speed-sensitive differentials. The frictional clutch may be actuated by various hydraulic pump mechanisms which may be external to the differential casing or may be constructed of elements disposed inside the differential casing. However, such mechanisms usually are complicated and also add to the cost and difficulty of manufacture. Further, speed sensitive differentials are "reactive", i.e., they react after a wheel has already lost traction.

A prior art method of limiting slippage involves using a flyweight governor in combination with a clutch mechanism wherein the governor actuates the clutch mechanism when a predetermined differential rotation rate is detected. However, prior art devices using such arrangements are configured such that the governor almost instantaneously applies extremely high clutch torque to the output shafts, essentially locking the two output shafts together. Applying locking torque in such a manner applies very high stresses on the output shafts and may result in fracturing the output shafts.

The above described methods actuate a clutch mechanism using mechanical or hydraulic arrangements. It is desirable to control the actuation of a limited slip feature using electronic control methods. Electronic control methods provide the advantages of accurate, reliable control within a narrow control band. Electronic control methods also allow operating parameters to be easily changed, for example by programming the electronic control systems to respond to a particular range of differentiation speeds or some other vehicle parameter such as throttle position.

Thus, what is needed is a simple, durable and reliable controllable differential which can effectively provide torque to the wheel with traction.

What is also needed is a controllable differential which applies a predetermined amount of clutch torque in response to a predetermined differentiation condition of the differential.

What is also needed is a controllable differential which is electronically actuated to provide precise, and reliable control in providing torque to the wheel with traction.

What is also needed is a controllable differential which provides a predetermined amount of clutch torque each time a clutch mechanism is electronically actuated.

What is also needed is a controllable differential which provides an amount of clutch torque which depends on the conditions detected by electronic sensors, for example wheel speed sensors.

What is also needed is a controllable differential which is responsive to speed difference to provide the limited slip or locking function only when required, i.e., limited slip or lock when one wheel has lost traction, but operates as an open differential under normal traction conditions.

Lastly, what is also needed is a controllable differential which applies a predetermined amount of clutch torque over a predetermined period of time in response to a loss of traction.

SUMMARY OF THE INVENTION

The present invention is a controllable differential having a clutch mechanism which transfers torque between a differential casing and a side gear disposed therein in response to the application of an initiating force by an electronic actuator. The clutch mechanism comprises a cone clutch element and an insert disposed between the side gear and the rotatable casing, wherein the cone clutch element and the insert include complementary frustoconical engagement surfaces and are adapted to move axially with respect to the rotatable casing. The cone clutch element and the side gear include camming portions having ramp surfaces which interact to produce a predetermined amount of axial movement by the cone clutch element with respect to the side gear when the initiating force is applied by the electronic actuator. The electronic actuator comprises an electronic control system having sensors which sense a predetermined rotational condition of the side gear and other selected components of the controllable differential, and an electromagnet which applies the initiating force, which may be variable, to the cone clutch element.

During non-slipping conditions, the present controllable differential operates as an open differential wherein the cone clutch element is disengaged from the insert and the cone clutch element rotates with the associated side gear. When a predetermined rotational condition of the differential components is sensed, such as excessive rotation of the side gear with respect to the differential casing or excessive rotation between the side gears and the pinion gears, the electronic control system actuates the electromagnet to apply an initiating force to the cone clutch element. The initiating force produces an initial axial movement of the cone clutch element such that the cone clutch element frictionally contacts the insert and momentarily slows down with respect to the side gear. The momentary slowdown causes the cam portions to interact and provide axial separation forces which axially move the cone clutch element and the insert by a predetermined distance to thereby transfer a predetermined amount of torque from the rotatable casing to the side gear. The present invention comprises differential embodiments having ball and ramp arrangements in place of the interacting cam portions.

The invention comprises, in one form thereof, a controllable differential which transfers a predetermined amount of torque when an initiating force is applied, comprising a rotatable casing, a pinion gear rotatably supported in the rotatable casing, a side gear rotatably supported in the casing and coupled to an output element, the side gear meshingly engaged with the pinion gear, a clutch disposed between the side gear and the rotatable casing, the clutch comprising a cone clutch element and an insert adapted to frictionally engage each other, the cone clutch element and the insert adapted for axial movement with respect to the rotatable casing to thereby transfer torque between the rotatable casing and the side gear, and an electronic actuator adapted to apply the initiating force to the clutch in response to the presence of a predetermined rotational condition of the differential components to frictionally engage the cone clutch element with the insert and produce a predetermined axial movement of the cone clutch element and the insert to thereby transfer a predetermined amount of torque between the rotatable casing and the side gear.

The invention comprises, in another form thereof, a controllable differential which transfers torque in relation to an actuating force, comprising a rotatable casing, pinion gears rotatably supported in the rotatable casing, a side gear rotatably supported in the casing and coupled to an output element, the side gear meshingly engaged with the pinion gears, a clutch disposed between the side gear and the rotatable casing, the clutch comprising a cone clutch element adapted to frictionally engage a surface of the rotatable casing to thereby transfer torque between the rotatable casing and the side gear, and an electronic actuator adapted provide the actuating force to the clutch in response to an external signal provided from a vehicle control system or an independent differential control system, the clutch adapted to transfer torque between the rotatable casing and the side gear in the presence of the actuating force.

The invention comprises, in another form thereof, a controllable differential, comprising a rotatable casing, a pinion gear rotatably supported therein, a first side gear also rotatably supported in the casing and having a camming portion, the first side gear coupled with a first output member, a second side gear also rotatably supported in the casing and coupled with a second output member, a first clutch engageable with the casing and having a camming portion, an electrically actuated actuator, a camming element having an axis of rotation and disposed between and coupling the first side gear and the first clutch, the camming element having a first camming portion and a second camming portion, the first element camming portion rotatably coupled to the first clutch camming portion, said second element camming portion rotatably coupled to the first side gear camming portion, and a second clutch coupled to the second side gear and engageable with the casing. The actuation of the first clutch by the actuator engages the first clutch with said casing. The camming element forces the second clutch into engagement with the rotating casing.

The invention further provides a controllable differential, comprising a rotatable casing, differential gearing disposed within the casing and linking it with an output element disposed therein, a clutch also disposed within the casing and adapted to transfer torque between the casing and the output element, and an electromagnet arranged to generate a generally toroidal magnetic flux path encircling the electromagnet and magnetically forcing the clutch into engagement with the casing, which comprises a nonmagnetic portion adjacent the electromagnet; the flux path surrounds the nonmagnetic casing portion.

BRIEF DESCRIPTION OF THE DRAWINGS

The above mentioned and other features and objects of this invention, and the manner of attaining them, will become more apparent and the invention itself will be better understood by reference to the following description of the embodiments of the invention taken in conjunction with the accompanying drawings, wherein:

FIG. 1 is a sectional view of a controllable differential of the present invention;

FIG. 2 is an enlarged fragmentary sectional view of FIG. 1 showing the differential in the disengaged phase;

FIG. 3 is an enlarged fragmentary sectional view of FIG. 1 showing the differential in the transition phase;

FIG. 4 is an enlarged fragmentary sectional view of FIG. 1 showing the differential in the engaged phase;

FIG. 5 is a perspective view of the cone clutch element showing the camming portion and its ramp surfaces;

FIG. 6 is a perspective view of the side gear showing the camming portion and its ramp surfaces;

FIG. 7 is an illustration of the design factors associated with the design of the camming portions;

FIG. 8 is a sectional view of a second embodiment of a controllable differential of the present invention, showing details of the electronic initiating mechanism;

FIG. 9 is a sectional view of a third embodiment of the controllable differential of the present invention, showing a variably controlled electronic initiating mechanism;

FIG. 11 is a schematic representation of the ball ramp shown in FIG. 10;

FIG. 13 is a fragmentary sectional view of the embodiment of FIG. 12, showing an alternative air gap configuration;

FIG. 14 is an enlarged view of the ball and ramp arrangement of the differential of FIG. 12 in the disengaged state, with emphasis on the helical slot profiles, which are not in true section;

FIG. 15 is an enlarged view of the ball and ramp arrangement of the differential of FIG. 12 in a partially engaged state, with emphasis on the helical slot profiles, which are not in true section;

FIG. 16 is an enlarged view of the ball and ramp arrangement of FIG. 12 in the fully engaged state, with emphasis on the helical slot profiles, which are not in true section;

FIG. 17 is a tabulation of force and torque values for an example differential having characteristics which cause the cam portions to lock upon the clutch element being subjected to a momentary, 10 pound triggering initiation force;

FIG. 19 is a tabulation of force and torque values for an example differential having characteristics which cause the cam portions to lock upon the clutch element being subjected to a sustained 10 pound initiation force;

FIG. 21 is a tabulation of force and torque values for an example differential having characteristics which prevent the cam portions from locking upon the clutch element being subjected to a momentary, 10 pound triggering initiation force;

FIG. 23 is a tabulation of force and torque values for an example differential having characteristics which prevent the cam portions from locking upon the clutch element being subjected to a sustained 10 pound initiation force.

Figure 10:
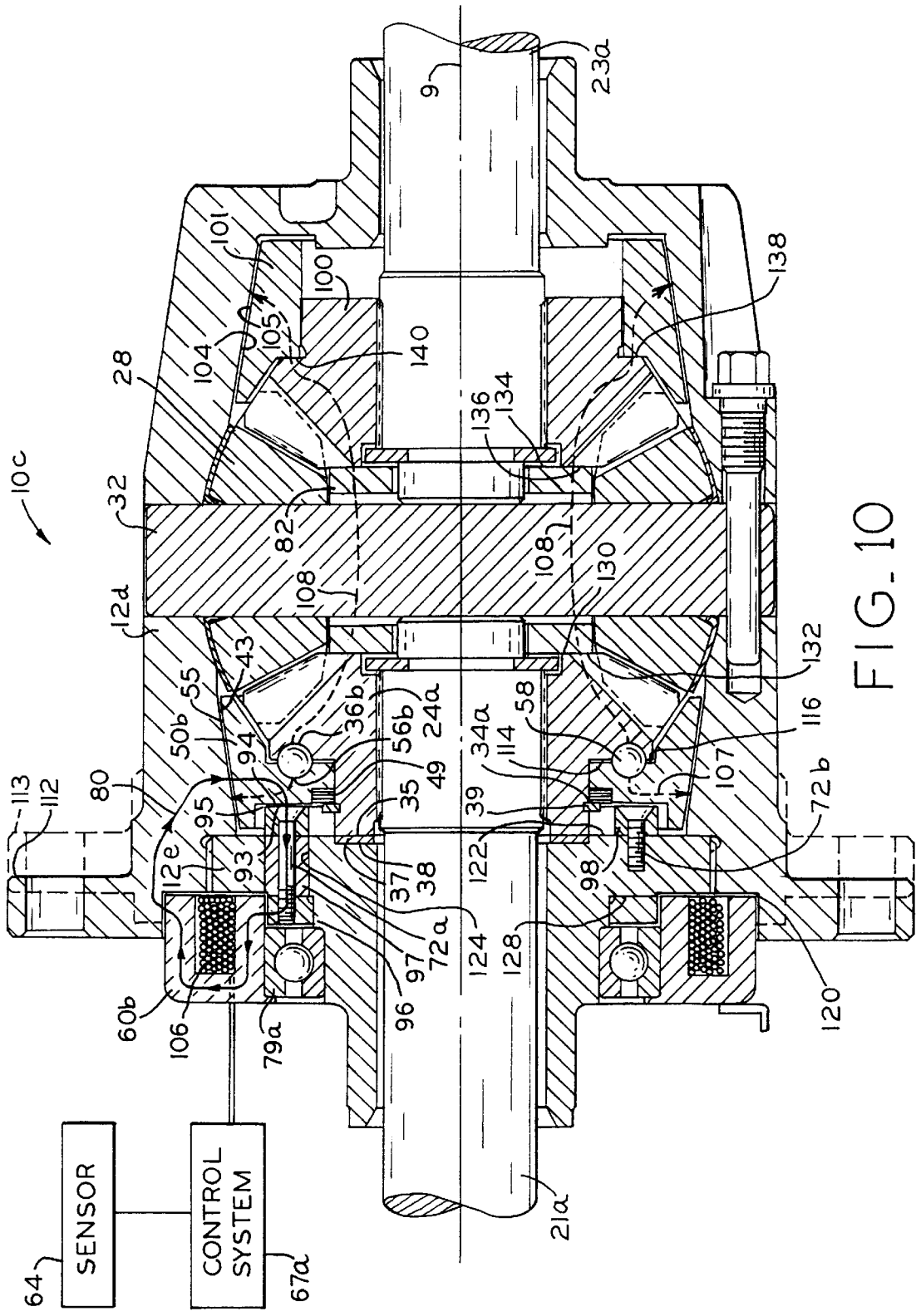
FIG. 10 is a sectional view of a fourth embodiment of the controllable differential of the present invention, including an alternative actuating method, ramping mechanism and additional frustoconical engagement structure.

Corresponding reference characters indicate corresponding parts throughout the several views. Although the drawings represent several embodiments of the present invention, the drawings are not necessarily to scale and certain features may be exaggerated in order to better illustrate and explain the present invention. The exemplifications set out herein illustrate embodiments of the invention, in several forms, and such exemplifications are not to be construed as limiting the scope of the invention in any manner.

DETAILED DESCRIPTION OF THE INVENTION

The embodiments disclosed below are not intended to be exhaustive or limit the invention to the precise form disclosed in the following detailed description. Referring to the drawings, and particularly to FIGS. 1–4, limited slip differential 10 of the present invention comprises differential casing 12 which is constructed by joining casing parts 12a and 12b to form a generally cylindrical structure having inner cavity 13. Inner cavity 13 is constructed to hold a differential gear assembly and includes end walls formed on the interior surfaces of casing parts 12a, 12b. The exterior surface of casing 12 includes flange 14 formed on one side thereof for connecting differential 10 to a driving ring gear (not shown) using conventionally known means, such as threaded fasteners (not shown). Casing 12 also includes hollow receiving hubs 16, 18 on each end, the hubs defining apertures 20, 22 for accepting output shafts 21, 23.

Disposed within inner cavity 13 are meshingly engaged pinion gears 28, 30 and side gears 24, 26. Pinion gears 28, 30 are disposed at right angles to side gears 24, 26 and are rotatably mounted on cross pin 32. Cross pin 32 is fixedly disposed in inner cavity 13, generally near the middle of inner cavity 13. Cross pin 32 is locked in position within casing 12 such that pinion gears 28, 30 rotate with casing 12 around axis 9 defined by hubs 16, 18. Pinion gears 28, 30 can also rotate around axis 8 of cross pin 32.

Side gears 24, 26 are axially aligned and rotatably disposed within differential casing 12 to rotate about horizontal axis 9. Side gears 24, 26 include internal splines 25, 27 which engage corresponding splines of output shafts 21, 23. The roots and teeth of side gears 24, 26 meshingly engage the roots and teeth of pinion gears of 28, 30 such that differentiation can be effected between casing 12 and output shafts 21, 23. Further, cavity 31 is disposed between side gears 24, 26.

Side gear 24 further includes elongate portion 33. Elongate portion 33 includes end portion 35 which contacts thrust washer 37 which in turn contacts surface 38 of casing part 12a. The outer surface of elongate portion 33 also includes groove 34 which fittingly receives snap ring 39. As indicated in FIGS. 1–4, snap ring 39 is adjacent to casing surface 46 on one side and contacts Belleville spring 49 on the other side.

As particularly shown in FIG. 6, side gear 24 also includes camming portion 36 having ramp surfaces 36a disposed around the axis of side gear 24. As described further below, camming portion 36 and ramp surfaces 36a contact and interact with camming portion 56 and ramp surfaces 56a of cone clutch element 50 to force cone clutch element 50 to move axially to the left as seen in FIG. 1 with respect to side gear 24 when the clutch mechanism of the present limited slip differential is electronically actuated. Side gear 24 also moves axially in the opposite direction. However, its extent of travel is limited by pinion gears 28 and 30.

Camming portion 36 interacts with a similarly arranged camming portion of the clutch mechanism which includes cone clutch element 50 and insert 40. Cone clutch element 50 is disposed between side gear 24 and insert 40 and is adapted to transfer frictional torque from differential casing 12 to side gear 24. As shown in FIGS. 1–5, cone clutch element 50 comprises an annular element having a generally T-shaped cross section. Cone clutch element 50 includes frustoconical engagement surface 55 which is adapted to frictionally contact frustoconical engagement surface 43 of insert 40. Cone clutch element 50 also includes portion 52 disposed adjacent elongate portion 33 of side gear 24. Portion 52 includes surface 53 which abuts Belleville spring 49. In the disengaged position shown in FIG. 2, Belleville spring 49 urges cone clutch element 50 to the right so that frustoconical engagement surface 55 is just off and out of contact with frustoconical engagement surface 43, as shown by gap 45.

As shown in FIG. 5, cone clutch element 50 also includes camming portion 56 having ramp surfaces 56a disposed around the axis of cone clutch element 50. Ramp surfaces 56a are complementary to ramp surfaces 36a such that in the disengaged state, ramp surfaces 36a and 56a are meshingly engaged and fully seated within each other, and remain so as cone clutch element 50 and side gear 24 rotate at the same speed. However, when cone clutch element 50 and side gear 24 rotate at different speeds, the ramp surfaces 36a and 56a ride up on each other to thereby apply axial separation forces to cone clutch element 50 and side gear 24. As described further below, this feature is used in conjunction with the initiating force to fully engage cone clutch element 50 and transfer a predetermined amount of torque each time the initiating force is applied.

Cone clutch element 50 further includes portion 51 which is disposed near casing part 12a and inner end 62 of the electromagnet 60. In the disengaged position shown in FIG. 2 wherein cone clutch element 50 is urged to the right by Belleville spring 49, gap 63 (FIG. 2) exists between clutch element portion 51 and inner end 62. When an initiating force is applied by electromagnet 60 to cone clutch element 50, cone clutch element 50 moves to the left and reduces the size of gap 63.

Insert 40 is disposed between cone clutch element 50 and casing part 12b and is rotationally fixed so that it cannot rotate, but is axially movable, with respect to casing 12. Insert 40 includes end portion 41 which is disposed toward casing part 12a and end portion 42 which is disposed away from casing part 12a. Belleville spring 48 is disposed between casing part 12a and end portion 41 of insert 40 to thereby urge insert 40 to the right in FIGS. 1–4. Insert 40 also includes frustoconical engagement surface 43 which is adapted to frictionally engage frustoconical engagement surface 55 of cone clutch element 50 to transfer frictional torque between surfaces 43 and 55.

Based on the above, it can be seen that when the limited slip feature is not actuated, Belleville spring 49 urges cone clutch element 50 to the right such that frustoconical engagement surfaces 43 and 55 remain disengaged and differential 10 operates as an open differential. However, when the limited slip feature is desired, electromagnet 60 applies an initiating force to cone clutch element 50 causing cone clutch element 50 to move to the left as seen in FIGS. 1–4 and resulting in an interaction between frustoconical engagement surfaces 43 and 55 to cause a momentary difference in rotational speed of side gear 24 and cone clutch element 50. Camming portions 36 and 56 will therefore interact to cause the clutch mechanism to engage and to transfer a predetermined amount of torque from casing 12 to side gear 24.

The initiating force initially urges cone clutch element 50 to the left in FIGS. 1–4 to frictionally engage frustoconical engagement surfaces 43 and 55. The frictional engagement momentarily slows down cone clutch element 50 with respect to side gear 24. This momentary slow down causes ramp surfaces 36a and 56a to ride up on each other and thus apply further axial separation forces between cone clutch element 50 and side gear 24. The separation forces cause cone clutch element 50 to move further axially to the left, thereby ensuring tight seating of frustoconical engagement surfaces 43 and 55 and also causing cone clutch element 50 and insert 40 to move axially against Belleville springs 48 and 49. The axial movement limit of cone clutch element 50 and insert 40, as well as the maximum ride up of ramp surfaces 36a and 56a, is reached when Belleville spring 49 is fully collapsed, as shown in FIG. 4. At this point cone clutch element 50 transfers a predetermined amount of torque between casing 12 and side gear 24. It can be seen that once the initiating force is applied, the above-described sequence occurs automatically until the clutch mechanism is fully engaged to transfer a predetermined amount of frictional torque between casing 12 and side gear 24. As discussed further below, the differential may be designed such that the clutch will disengage upon release of the initiating force.

Electronic actuator assembly 59 is disposed adjacent to and is connected with casing part 12a to provide the initiating force to initially move cone clutch element 50. Electronic actuator assembly 59 comprises annular in cross-section and generally T-shaped electromagnet 60 having leg portion 61, which extends through opening 15 of casing part 12a, and inner portion 62 which is disposed near clutch element portion 51. Electromagnet 60 is connected to sensors 64 and an electronic control system 67 via slip ring assembly 65 and connecting wires 66. Sensors 64 sense a differentiation condition between side gear 24 and pinion gears 28 and 30. The sensors can comprise sensors to measure the axle speeds or may include other vehicle parameters such as an onboard accelerometer and the like. When it is desired to actuate the limited slip feature, the electronic control system 67 energizes electromagnet 60 to thereby move cone clutch element 50 to the left. The electronic control system may comprise any conventionally known system or group of elements capable of detecting a predetermined rotational condition of the differential components, such as the rate of differential rotation between output shafts 21 and 23, or rotation between pinion gears 28, 30 and side gears 24, 26, and energizes electromagnet 60 when a predetermined rotational condition is detected.

The operation of the electronically initiated limited slip differential of FIGS. 1–4 is now described. When the differential is initially in the resting position, wherein the components of differential 10 are interconnected and assembled as described above, differential 10 is connected to output shafts 21, 23, which are respectively coupled to stationary wheels (not shown) that are in contact with a ground surface, no force is applied to differential 10 by a vehicle engine (not shown) through a driving ring gear (not shown) connected via flange 14, so that differential casing 10 is stationary. In such a resting condition, Belleville spring 48 urges insert 40 to the right such that end portion 42 abuts the adjacent surface of casing part 12*b*, Belleville spring 49 urges cone clutch element 50 to the right such that frustoconical engagement surface 55 is just off frustoconical engagement surface 43, and cam portions 36 and 56 are fittingly engaged. The engine provides torque to the wheels in the conventional manner, namely through the ring gear, differential casing 12, cross shaft 32, pinion gears 28, 30, side gears 24, 26, splines 25, 27, and output shafts 21, 23 to the wheels.

In the case where both wheels have traction and the engine is able to apply torque to both wheels, limited slip differential 10 operates as an open differential. The side gear separating forces are directly transmitted to casing 12 via end portion 35 of elongate portion 33 through thrust washer 37 into casing surface 38. Thus, the side gear separating forces have no effect on the operation of limited slip differential 10. Frustoconical engagement surfaces 43 and 55 remain disengaged, side gears 24, 26 rotate freely with respect to casing 12 and cone clutch element 50 rotates at the same rate as side gear 24. FIG. 2 illustrates limited slip differential 10 in the open differential state.

In situations where one wheel is slipping, i.e., one wheel is on a surface having a low coefficient of friction and the vehicle engine is unable to generate torque on the wheel with traction, differentiation between the two wheels occurs and it is desired to actuate the clutch mechanism to prevent a spin out. In such a case, the electronic control system applies an initiating force by energizing electromagnet 60 when a predetermined rotational condition is detected to thereby move cone clutch element 50. Energizing electromagnet 60 applies an attraction force to clutch element portion 51 thereby causing cone clutch element 50 to initially move to the left in FIG. 3 and reduce the size of gap 63 (FIG. 2).

The initial axial movement to the left of cone clutch element 50 to the left causes frustoconical engagement surface 55 to frictionally engage frustoconical engagement surface 43 of insert 40. Due to this frictional engagement, cone clutch element 50 momentarily slows down with respect to side gear 24. The momentary difference in the rotation rate between cone clutch element 50 and side gear 24 causes ramp surfaces 36*a* and 56*a* to ride up on each other. The ride up between ramp surfaces 36*a* and 56*a* produces further axial separation forces which move cone clutch element 50 further to the left. The further axial movement causes frustoconical engagement surfaces 43 and 55 to fully engage and also cause cone clutch element 50 and insert 40 to move together axially, thereby collapsing Belleville springs 48 and 49. The tight engagement and further axial movement of cone clutch element 50 and insert 40 transfer a predetermined amount of torque between differential casing 12 and side gear 24. This transition phase is shown in FIG. 3.

Maximum axial movement of cone clutch element 50 and insert 40 and maximum ride up of ramp surfaces 36*a* and 56*a* is reached when Belleville spring 49 is fully collapsed. FIG. 4 illustrates the arrangement of limited slip differential 10 when the clutch mechanism is fully engaged. At this point, a predetermined amount of clutch torque is transferred through cone clutch element 50, and cone clutch element 50 again rotates at the same speed as side gear 24. When the limited slip feature is no longer required, i.e., both wheels have traction, electromagnet 60 is de-energized, Belleville springs force cone clutch element 50 and insert 40 back to the original positions and limited slip differential returns to the open state.

It is to be noted that once the initial axial movement of cone clutch element 50 is induced by electronic actuator 59, the interaction between frustoconical engagement surfaces 43 and 55 and between ramp surfaces 36*a* and 56*a* ensure that cone clutch element 50 becomes fully engaged and a predetermined amount of torque is transferred. In other words, every time electronic actuator 59 initiates the movement of cone clutch element 50 by energizing electromagnet 60 to apply an attraction force to clutch element portion 51, the elements of cone clutch element 50, side gear 24 and insert 40 are set in motion to provide the predetermined amount of axial movement and to transfer a predetermined amount of frictional torque between casing 12 and cone clutch element 50. The design characteristics of Belleville springs 48 and 49 and the arrangement of frustoconical engagement surfaces 43 and 55 may be changed to vary the amount of clutch torque which is transferred.

A second embodiment of the present invention is shown in FIG. 8. One difference between the second embodiment and the embodiment shown in FIGS. 1–4 lies in the arrangement of electronic actuator 59. As shown in FIG. 8, in controllable differential 10*a*, electromagnet 60*a* is disposed outside of rotatable casing 12 and does not rotate. The actuating assembly for initiating the movement of cone clutch element 50*a* comprises plate 70 connected to actuator element 73 by screw 72. Screw 72 is disposed inside spacer 71 which is disposed inside opening 15*a* of casing part 12*a*. Actuator element 73 is generally L-shaped in cross-section and includes leg portions 73*a* and 73*b*. Groove 75 is disposed in leg portion 73*b* and is adapted to receive snap ring 74 which abuts thrust bearing 78. Thrust bearing 78 also abuts snap ring 76 which is disposed in groove 77 of cone clutch element 50*a*. Cone clutch element 50*a* is substantially similar to cone clutch element 50 of the embodiment shown in FIGS. 1–4 except that cone clutch element 50*a* includes clutch element portion 51*a* which is adapted to accept snap ring 76 and interact with thrust bearing 78 via snap ring 76.

Nonrotating electromagnet 60*a* is supported on rotatable casing part 12*a* by thrust bearing 79, thus obviating the need for a slip ring arrangement. In this embodiment, the actuating assembly, comprising plate 70, spacer 71 and actuator element 73, rotates with casing 12 and relative to stationary electromagnet 60*a*

The operation of controllable differential 10*a* with regard to the clutch mechanism is similar to that of the first embodiment. When the electronic control system detects a predetermined rotational condition indicating slippage, electromagnet 60*a* is energized, thereby providing an attraction force on plate 70 and urging plate 70 to move to the left as viewed in FIG. 8. The axial movement of plate 70 to the left is transmitted to cone clutch element 50*a* via spacer 71, actuator element 73, snap ring 74, thrust bearing 78 and snap ring 76. Again, the initial movement of cone clutch element 50 frictionally engages frustoconical engagement surfaces 43 and 55 thereby causing a momentary difference in the rate of rotation between cone clutch element 50*a* and side gear 24. This momentary difference causes ramp surfaces 36*a* and 56*a* of cam portions 36 and 56, respectively, to ride up on each other thereby producing further axial movement of cone clutch element 50*a* to the left, away from side gear 24. The axial movement continues until the clutch mechanism is fully engaged, i.e., Belleville spring 49 is fully collapsed, and transfers a predetermined amount of frictional torque, between casing 12 and side gear 24.

A third embodiment of the present invention is shown in FIG. 9. A difference between the third embodiment and the second embodiment is that the third embodiment does not include insert 40 nor Belleville spring 48. Here, frustoconical engagement surface 55 of cone clutch element 50a frictionally contacts casing part 12c. The lack of insert 40 and Belleville spring 48 allows limited slip differential 10b of the third embodiment to transfer a variable amount of frictional torque between casing 12 and cone clutch element 50a based on an actuating force provided by electromagnet 60a. The movement of cone clutch element 50a is initiated in similar fashion to the second embodiment, namely, by energizing nonrotating electromagnet 60a to move plate 70, spacer 71 and actuator element 73 to the left as viewed in FIG. 9, thereby causing cone clutch element 50a to move to the left in a manner similar to that of the second embodiment, shown in FIG. 8. However, in the case of the third embodiment, the movement of cone clutch element 50a does not result in ramp surfaces 36a and 56a automatically reaching maximum ride-up, Belleville spring 49 fully collapsing and cone clutch element 50a moving a predetermined axial distance. Instead, the amount of axial movement and the amount of frictional torque transferred depends on the actuating force applied by electromagnet 60a as controlled by control system 67a Based on the analysis of the ramp surface and frustoconical engagement surface geometries described below, the third embodiment is arranged so that an actuating force does not automatically result in full engagement of the clutch mechanism. Instead the amount of frictional torque transferred depends on the amount of force applied by electromagnet 60a, which varies with the amount of current therethrough, controlled by control system 67a. This can be accomplished either by current control or by pulse width modulation. The current level is determined by the parameters of the control system's programming, based on the input signals received from the vehicle sensors 64. Higher current creates more magnetic attraction force between electromagnet 60a and plate 70. When the magnetic force is removed, Belleville spring 49 urges cone clutch element 50 to move to the right as viewed in FIG. 9 such that frustoconical engagement surface 55 disengages from casing part 12c and controllable differential 10b returns to the open differential state. Further, although differential 10b is used with control system 67a, the scope of the present invention should not be construed as being so limited, and control system 67 may instead be used to control differential 10b.

Referring now to FIGS. 5–7, the geometries of ramp surfaces 36a, 56a and cone clutch elements 50, 50a of differentials 10, 10a, 10b are some of the factors which determine whether the separation forces on ramp surfaces 36a, 56a will continue to increase and add force to cone clutch element 50, 50a to fully engage the clutch mechanism or will become reduced to zero, adding nothing to the ability of cone clutch element 50, 50a to engage casing 12. In other words, these geometries determine whether the cone clutch element 50, 50a engages in a self-progressive manner when an initiating force is applied or whether the cone clutch element will disengage with removal of the initiating force. As will be seen, while self-progressive, full clutch engagement results in higher torque transfer capabilities between the casing and the axles through the clutch, complete control over clutch disengagement is sacrificed. Conversely, to maintain complete control over clutch disengagement limits the clutch's torque transfer capability to a maximum, albeit definable, limit lower than the fully engaged level. The relationships between the design elements of cone clutch element 50, 50a and ramp surfaces 36a, 56a are now described with references to FIG. 7 which shows camming portions 36 and 56 laid out along an axis which is perpendicular to axis 9.

Factors necessary to describe the characteristics of cone clutch element 50, 50a include:

$\mu_c$=coefficient of friction between the frustoconical engagement surfaces 43 and 55;

$\alpha$=angle of frustoconical engagement surface 55 from axis 9; and $R_c$=mean radius of frustoconical engagement surface 55 from axis 9.

These variables determine the "Cone Factor," CF, defined as:

$$CF = (R_c \times \mu_c)/\sin \alpha.$$

Factors necessary to describe the characteristics of ramp surfaces 36a, 56a include:

$\mu_r$=coefficient of friction between ramp surfaces 36a, 56a;

$\phi$=angle of ramp surfaces 36a, 56a; and $R_r$=mean radius of ramp surfaces 36a, 56a from axis of rotation 9.

In this case, angle 4 is measured from a plane perpendicular to axis of rotation 9 and indicates the degree of rise in the ramp surfaces. For example, an angle $\phi$ of zero degrees indicates flat ramp surfaces. As angle $\phi$ increases, the degree of rise in the ramp surfaces becomes steeper. Thus, it can be envisioned that as angle $\phi$ increases, the ability to transfer loads axially between surfaces 36a and 56a decreases. Also, mean radius $R_r$ is a measure of the distance from axis of rotation 9 to the center of the ramp and is determined by the average of the inner and outer radii of the ramp surfaces. These variables are combined to define the "Ramp Factor," RF, as:

$$RF = \frac{1}{R_r[\tan(\phi + \text{Arctan}\mu_r)]}.$$

The "Separation Force," $F_s$, attributed to the relative rotation of slidably engaged camming portions 36a, 56a is defined as:

$$F_s = T_r \times RF$$

where Tr is the torque on the camming portions.

The factors determining CF and RF may be varied according to design and performance requirements. When CF×RF>1 or, it is expected, when CF×RF=1, differential 10, 10a or 10b will respond differently to external initiating force $F_e$ applied on cone clutch member 50 or 50a by electromagnet 60 or 60a than when CF×RF<1. Notably, $F_e$ must be greater than the opposing force exerted on the cone clutch member by Belleville spring 49 for the clutch to engage at all. Whether the product of CF and RF is greater than or less than one determines whether the torque on ramp surface 56a will produce sufficient separation force to self-progressively increase the "Cone Torque," $T_c$, defined as:

$$T_c = CF \times F_c$$

where $F_c$ is the axial force bearing on the cone.

When CF×RF>1 and momentary, triggering initiation force $F_e$ is applied, as when electromagnet 60 or 60a is energized and then immediately de-energized, cone clutch element 50 or 50a travels, over a very brief period of time, the full amount of predetermined axial movement, frictionally contacting clutch surfaces 43 and 55, and then continues to self-progressively increase the clutch engagement level automatically to its fully engaged point. When external initiation force $F_e$ is sustained, as when the current to electromagnet 60 or 60a is maintained over time, cone clutch element 50 or 50a travels the fall amount of its axial movement, frictionally contacting clutch surfaces 43 and 55, in approximately the same short period. However, with initiating force $F_e$ sustained, the resulting cone torque $T_c$ progresses at a substantially faster rate, vis-a-vis triggering initiating force $F_e$, to the fully engaged point. In either case of a triggering or sustained external force, when CF×RF>1 clutch engagement self-progresses upon axial separation of cone clutch element 50, 50a and side gear 24, and does not disengage until the relative torque on ramp surfaces 36a, 56a is completely removed, which will normally occur when the axles or differential casing are torsionally unloaded.

Referring now to FIGS. 17–20, example clutch performance data for a differential such as differential 10, 10a, or 10b having CF×RF>1 is provided. FIG. 17 comprises a table illustrating the case of a 10 pound triggering initiating force $F_e$. In this example, $\mu_c$ is 0.1, $\alpha$ is 9 degrees and $R_c$ is 1.654 inches, resulting in CF of 1.0573; $\mu_r$ is 0.05, $\phi$ is 32 degrees and $R_r$ is 1.321 inches, resulting in RF of 1.0867. Thus, CF×RF is 1.1489. Referring to FIG. 17, the following relationships between the tabulated variables hold at each point in time t, where time t-1 is the point in time immediately preceding time t:

$F_{ct}=F_{et}+F_{st-1}$;
$F_{st}=T_{rt}\times RF$;
$F_{ct}=F_{et}+(T_{rt-1}\times RF)$;
$T_{ct}=F_{ct}\times CF$;
$T_{rt}=T_{ct}$; and
$F_{ct}=F_{et}+(T_{ct-1}\times RF)$.

Figure 18:
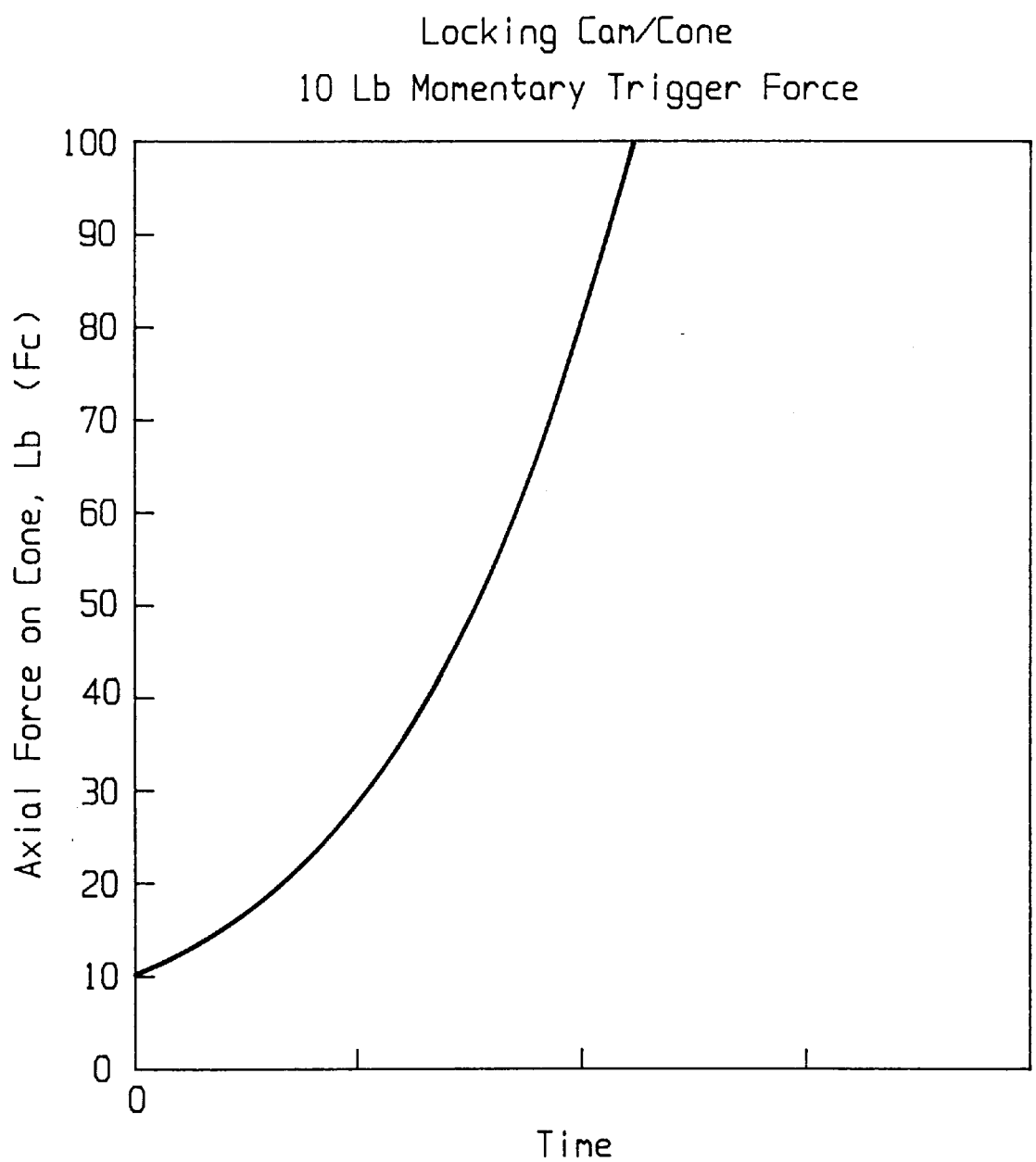
FIG. 18 is a graph showing how the value of the axial force on the clutch cone element, tabulated in FIG. 17, varies over time, with time shown qualitatively.

It can be seen that only a momentary triggering external force $F_e$ is necessary to initiate self-progressive engagement of the clutch. FIG. 18 is a graph illustrating how $F_c$ of FIG. 17 progresses over time, with time represented qualitatively rather than quantitatively.

Figure 20:
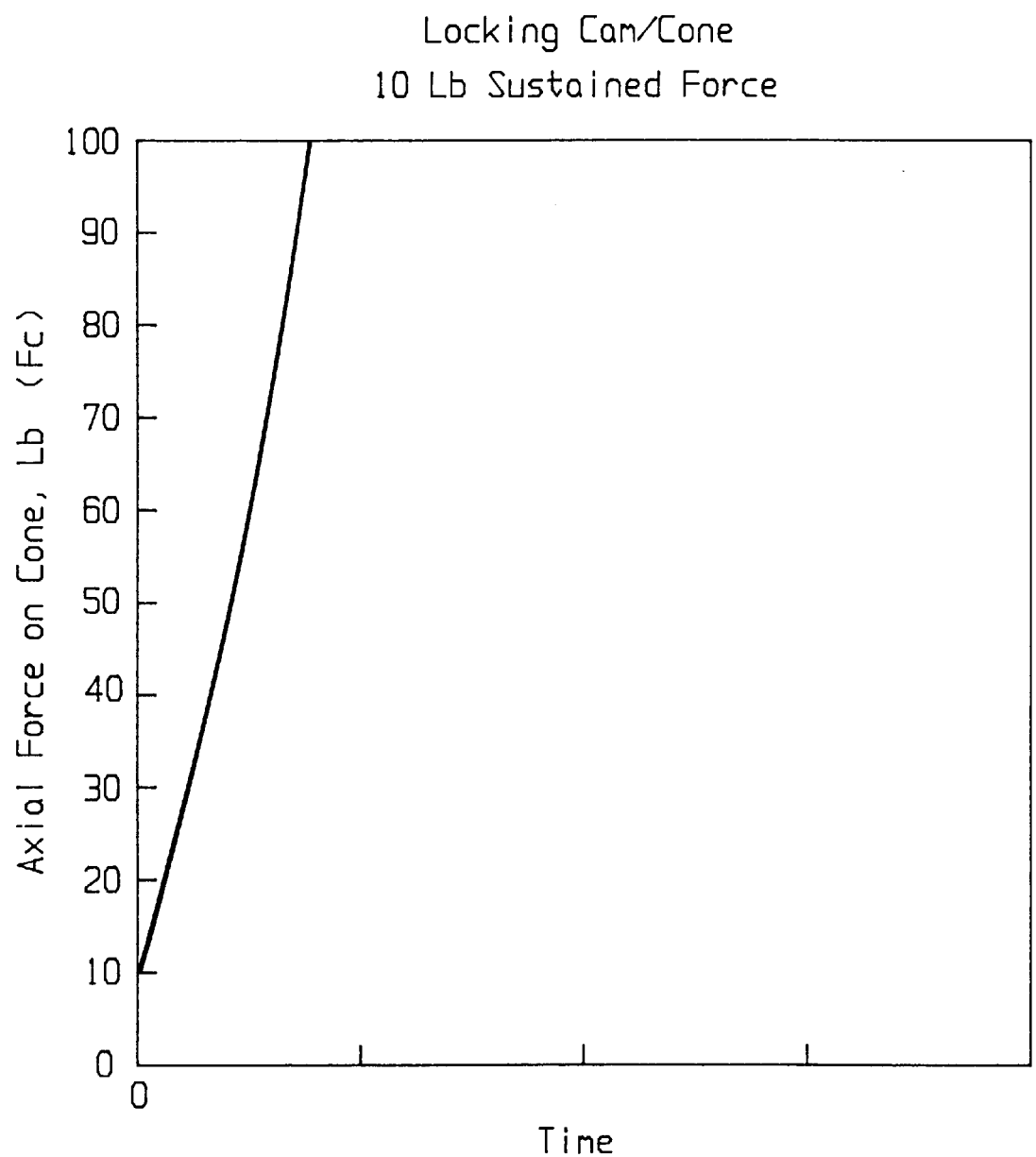
FIG. 20 is a graph showing how the value of the axial force on the clutch cone element, tabulated in FIG. 19, varies over time, with time shown qualitatively.

FIG. 19 comprises a table illustrating the case of a sustained 10 pound initiating force $F_e$, all other characteristics of the differential and its operation, and the mathematical relationships between the tabulated variables are equivalent to the previous example. FIG. 20 is a graph illustrating how $F_c$ of FIG. 19 progresses over time, with time represented qualitatively rather than quantitatively. As can be seen, with a sustained initiating force $F_e$ the clutch self-progressively engages at a substantially higher rate than experienced with only a momentary triggering force. As earlier mentioned, in either case of a triggering or sustained initiating force $F_e$, if CF×RF>1 the clutch will not disengage until either the casing or the axles are torsionally unloaded; as seen in the triggering $F_e$ examples of FIGS. 17 and 18, de-energizing the electromagnet providing the initiating force will not cause the clutch to disengage.

When CF×RF <1 clutch engagement does not self-progressively increase. Rather, the clutch will engage to a maximum, definable level. Further, the amount of frictional torque transferred from casing 12 to cone clutch element 50, 50a will vary with the actuating force $F_e$ applied, and when $F_e$ is removed, the axial separation force between cone clutch element 50, 50a and side gear 24 is overcome by the opposing axial force applied by Belleville spring 49 and disappears, the differential returning to the open differential state. Thus, by setting the variables defining CF and RF such that CF×RF<1, greater clutch control can be had vis-a-vis the case where CF×RF>1, although the achievable clutch engagement force $F_c$ and torque $T_c$ are comparatively much smaller. In differentials 10 or 10a, in which constant current levels are provided to electromagnet 60 or 60a by control system 67, where CF×RF<1, the clutch may be fully engaged by energizing the electromagnet and disengaged by merely de-energizing same. Similarly, in differential 10b, in which variable current levels are provided to electromagnet 10a by control system 67a, the clutch may be increasingly or decreasingly engaged by correspondingly varying the current through electromagnet 60a and disengaged by merely de-energizing same.

When CF×RF<1 and momentary, triggering external force $F_e$ is applied, as when electromagnet 60 or 60a is energized and then immediately de-energized, cone clutch element 50 or 50a travels, over a very brief period of time, the full amount of predetermined axial movement, frictionally engaging clutch surfaces 43 and 55, but the clutch mechanism does not reach its maximum engagement limit, for the only axial force exerted on cone clutch element 50 or 50a is $F_e$. Clutch engagement is not self-engaging as in the case where CF×RF>1. When CF×RF<1 and external force $F_e$ is sustained, as when the current to electromagnet 60 or 60a is maintained, cone clutch element 50 or 50a experiences the full amount of its axial travel in the same short period. However, the resulting cone torque $T_c$ quickly progresses to a maximum level. In either case of triggering or sustained $F_e$, where CF×RF<1, the clutch disengages under the force of Belleville spring 49 immediately upon the de-energizing of the electromagnet.

Referring now to FIGS. 21–24, example clutch performance data for a differential such as differential 10, 10a, or 10b having CF×RF<1 is provided. FIG. 21 comprises a table illustrating the case of a 10 pound momentary triggering external force $F_e$. In this example, the clutch-defining variables are equivalent to those of the previous case, where CF×RF>1, viz., $\mu_c$ is 0.1, $\alpha$ is 9 degrees and $R_c$ is 1.654 inches, resulting in CF of 1.0573. Similarly, cam ramp-defining variables $\mu_r$ and $R_r$ remain at 0.05 and 1.321 inches, respectively. Cam angle $\phi$, however, is increased to 46 degrees, providing RF of 0.6613. Thus, in this case CF×RF is 0.6991. As in the previous case, the following relationships between the variables tabulated in FIG. 21 hold at each point in time t, where time t-1 is the point in time immediately preceding time t:

$F_{ct}=F_{et}+F_{st-1}$;
$F_{st}=T_{rt}\times RF$;
$F_{ct}=F_{et}+(T_{rt-1}\times RF)$;
$T_{ct}=F_{ct}\times CF$;
$T_{rt}=T_{ct}$; and
$F_{ct}=F_{et}+(T_{t-1}\times RF)$.

Figure 22:
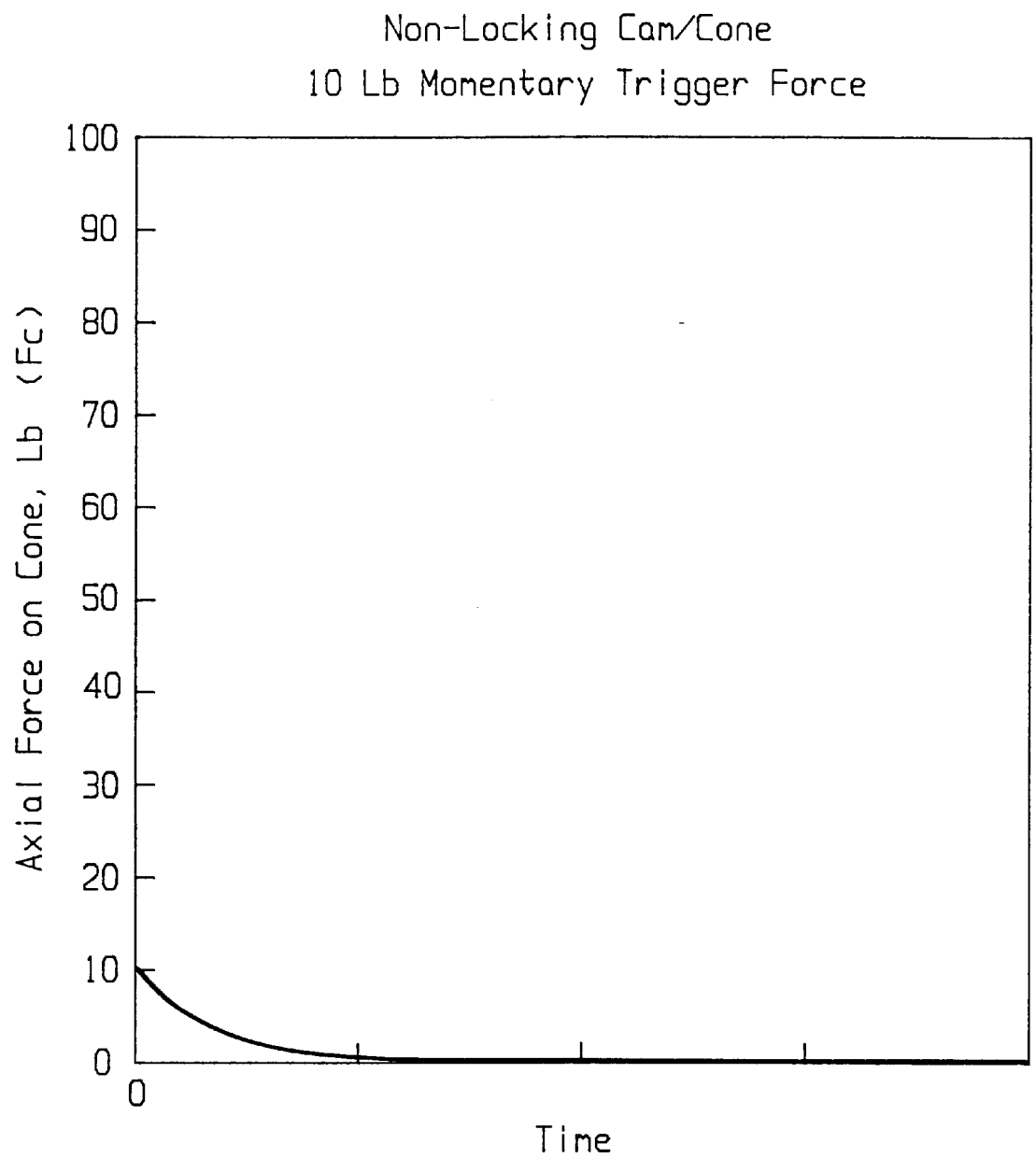
FIG. 22 is a graph showing how the value of the axial force on the cone clutch element, tabulated in FIG. 21, varies over time, with time shown qualitatively.

It can be seen that a momentary triggering external force $F_e$ results in only a very brief period of quickly diminishing clutch engagement in which $F_c$ reaches only the level of $F_e$. FIG. 22 is a graph illustrating how $F_c$ of FIG. 21 diminishes over time, with time represented qualitatively rather than quantitatively.

Figure 24:
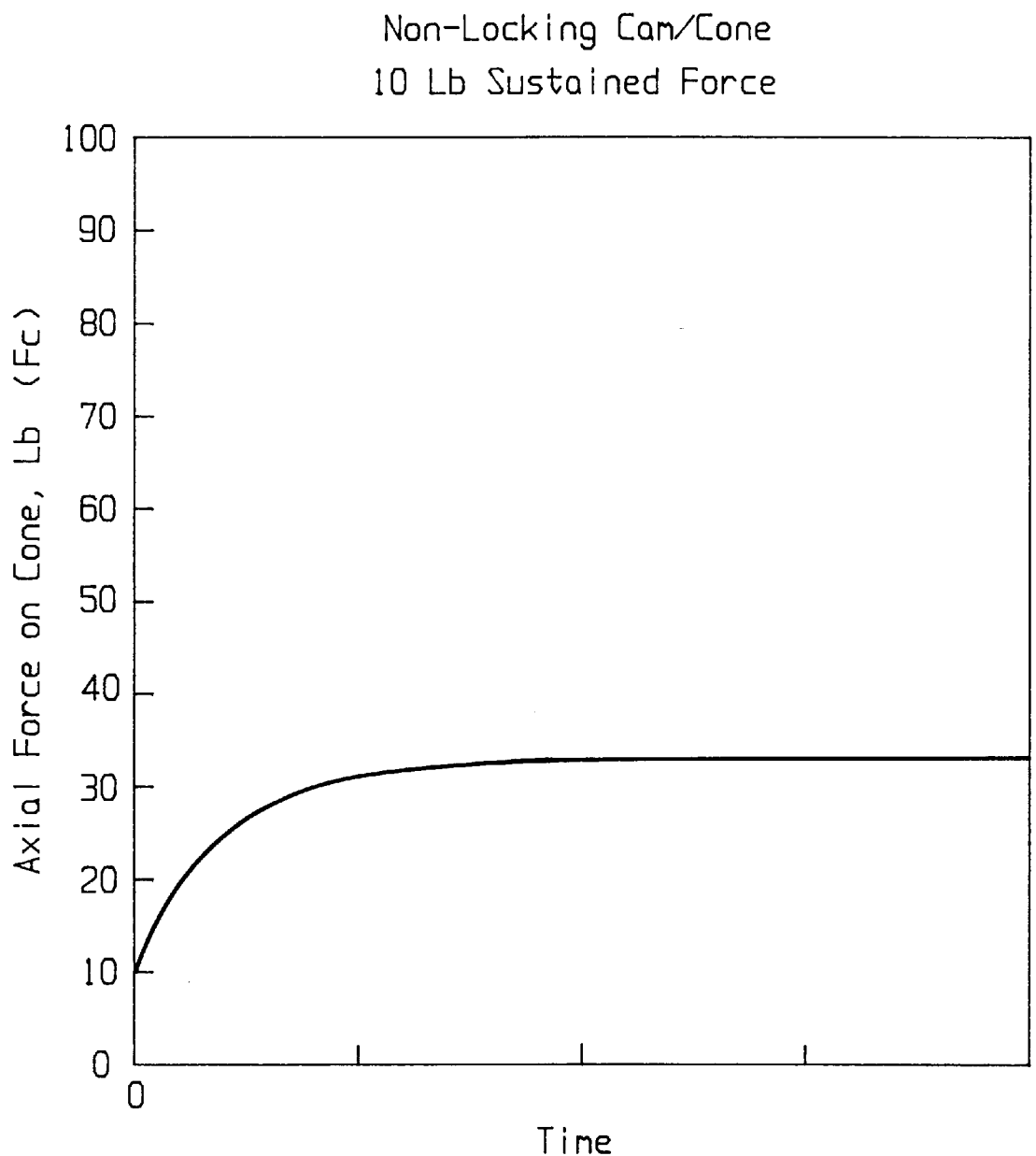
FIG. 24 is a graph showing how the value of the axial force on the cone clutch element, tabulated in FIG. 23, varies over time, with time shown qualitatively.
Figure 25:
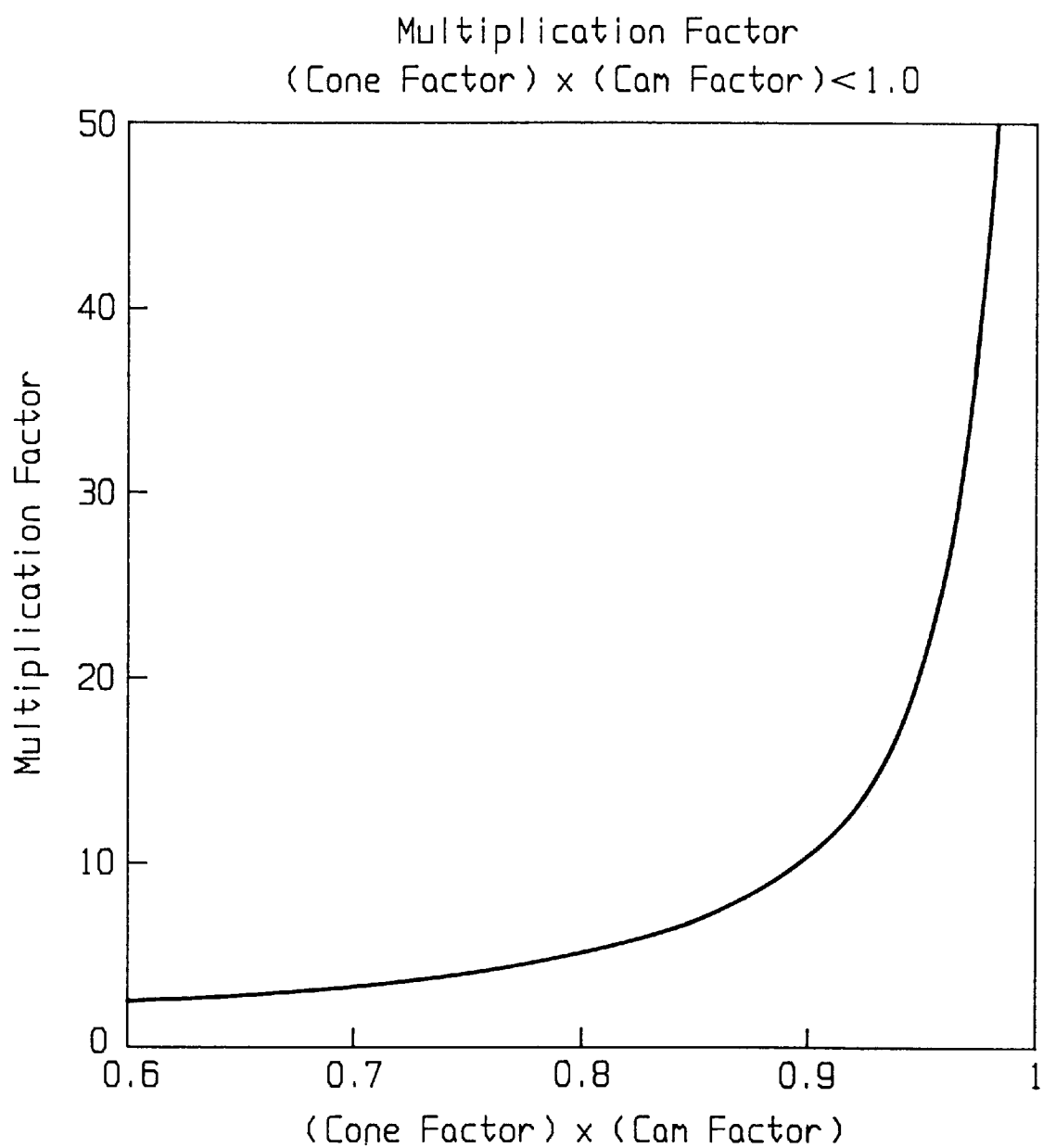
FIG. 25 is a graph showing the multiplication factor by which the initiation force is amplified to yield the axial force on the clutch for given values of CF×RF<1.

FIG. 23 comprises a table illustrating the example of a sustained 10 pound external force $F_e$, all other characteristics of the differential and its operation, and the relationships between the tabulated variables are equivalent to the previous, triggering force example. FIG. 24 is a graph illustrating how $F_c$ of FIG. 23 progresses over time to a maximum level, with time represented qualitatively rather than quantitatively. As can be seen, with a sustained external force $F_e$, the clutch progressively engages from the point at which $F_e$ is experienced to plateau at a substantially higher level, here approximately 3.5 times $F_e$. Thus, with CF×RF<1 and a sustained external force $F_e$, the characteristics of the clutch and its camming arrangement can be adapted to provide a constant multiplier effect between external force $F_e$ and the axial force on the cone, $F_c$. FIG. 25 graphically illustrates the calculated constant multiplier relating $F_e$ and $F_c$ for given values of CF×RF<1. As can be seen, by manipulating the cone clutch and camming ramp factors such that the product of CF×RF approaches 1, $F_e$ may be considerably amplified to produce a much greater $F_c$ value. With use of a variable output control system such as 67a, Fe, and thus $F_c$ and $T_c$ may be variably engaged and, because the clutch engagement is not self-progressing, the engagement level may be variably or altogether diminished in response to improved traction conditions sensed by sensors 64.

A fourth embodiment of the present invention, differential 10c, is shown in FIG. 10. The fourth embodiment includes several differences from the previous embodiments. First, nonrotating electromagnet 60b, relative to which rotatable casing 12 moves, directly applies an initiating force on cone clutch element 50b via a magnetic flux circuit rather than applying the force through a spacer 71, plate 70 and actuator element 73. Second, ball and ramp arrangement 36b, 58, 56b, disposed on the side gear 24a and cone clutch element 50b, induces additional axial movement between side gear 24a and cone clutch element 50b after the application of an initiating force. Third, second cone clutch element 101, added between a second side gear 100 and the rotatable casing 12, provides additional torque bias.

As shown in FIG. 10, nonrotating electromagnet 60b is disposed adjacent endcap 12e. Endcap 12e is constructed of a suitable nonmagnetic or paramagnetic material in order to create the magnetic flux circuit described further below. Such nonmagnetic materials may include, but are not limited to, AISI 300 series stainless Austenitic steel and manganese-nickel steel, which are paramagnetic materials having relative magnetic permeabilities very close to 1 (equivalent to air). Electromagnet 60b is also supported by bearing 79a, which maintains air gap 120 axially and radially separating the nonrotating electromagnet from rotating casing parts 12d, 12e and field ring 96.

Annular attractor ring 98 is attached to axial inside surface 122 of endplate 12e using threaded fasteners 72b, thus attractor ring 98 rotates with casing 12 about axis 9. A plurality of openings 124 is provided in endplate 12e, equally distributed about axis 9. Hollow cylindrical spacers 97 extend through openings 124, one of the axial ends of each spacer 97 abutting attractor ring 98. Annular field ring 96 abuts annular axial outside surface 128 of endplate 12e and the other axial end of each spacer 97. Fasteners 72a extend through and interconnect attractor ring 98, spacers 97, and field ring 96. Attractor ring 98 and end surface 93 of threaded fastener 72a are disposed adjacent surface 94 of cone clutch element 50b. Air gap 95 exists between surface 94 and attractor ring 98 and threaded fastener 72a. Field ring 96, spacer 97, attractor ring 98, fastener 72a, cone clutch element 50b and casing part 12d are made of suitable ferromagnetic materials for conducting the magnetic flux created by electromagnet 60b, fasteners 72a and spacers 97 providing a plurality of magnetic flux paths through openings 124 of nonmagnetic endcap 12e.

It can be seen that the present configuration creates a magnetic flux circuit 80 which moves cone clutch element 50b very slightly to the left as shown in FIG. 10 and reduces the size of air gap 95 when electromagnet 60b is energized. Surface 55 of cone clutch element 50b moves only in the range of 0.001–0.002 inch toward surface 43 of casing part 12d under the influence of the magnetic field, which corresponds to a decrease in air gap 95 of approximately 0.010 inch as primary cone clutch element 50b moves axially toward endcap 12e. The force on element 50b changes with the amount of flux created by electromagnet 60b. When electromagnet 60b is energized by control system 67a supplying variable current levels to coil windings 106, a correspondingly variable level of magnetic flux is generated along path 80. The magnetic flux travels from electromagnet 60b across air gap 120, through casing part 12d and cone clutch element 50b, across air gap 95, through attractor ring 98, fastener 72a, spacer 97, field ring 96, and back across air gap 120 to electromagnet 60b. Because endcap 12e is constructed of nonmagnetic or paramagnetic material, the magnetic flux in the materials of high magnetic permeability travels around endcap 12e. Due to the magnetic flux circuit, cone clutch element 50b is moved to the left as shown in FIG. 10 by the attraction forces between two pairs of surfaces, namely, between axial surfaces 93 and 94, and between frustoconical surfaces 43 and 55.

The force with which cone clutch element 50b is drawn to the left depends on the strength of the magnetic flux field generated by coil winding 106 of electromagnet 60b. The amount of magnetic flux created by coil 106 is variable and is determined by the number of turns of wire in the coil and the current flowing through the wire. This is commonly referred to as "NI", where N is the number of turns in the coil and I is the current. The amount of current varies and is controlled by control system 67a as described above with regard to the third embodiment.

The actuation sequence created by the momentary difference in rotational speed between cone clutch element 50b and side gear 24a as frustoconical surfaces 43 and 55 seat against each other is also similar to that of the third embodiment. The variable coil current induces a variable amount of magnetic clamping force between casing part 12d and cone clutch element 50b, which induces a variable amount of torque to be exerted by casing part 12d on cone clutch element 50b. Unlike the third embodiment (FIG. 9), however, the fourth embodiment (FIG. 10) provides the additional axial force between cone clutch element 50b and side gear 24a through use of a ball and ramp arrangement rather than by a camming arrangement between the side gear and the cone clutch element.

Referring to FIGS. 11A–11D, ball and ramp arrangement 36b, 58, 56b is comprised of a plurality of paired spiral slots 36b, 56b located in side gear 24a and cone clutch element 50b, respectively, which define a helically ramping path followed by ball 58, which may be steel, disposed in each slot pair, the ramp angle defined as angle $\phi_a$ (FIG. 11D). In the illustrated embodiment, six paired spiral slots 36b, 56b and six balls 58 are used, although it is anticipated that as few as three slot pairs and three balls may suffice. FIGS. 11B–D illustrate the action for an individual pair of spiral slots 36b, 56b and its associated ball 58.

During normal operation with electromagnet 60b deactivated, surfaces 114 and 116 of side gear 24a and cone clutch element 50b, respectively, are closely adjacent and separated by plane 118 (FIG. 11B), which is stationary relative to the differential, parallel to surfaces 114, 116 and perpendicular to axis 9. Surfaces 114 and 116 may barely contact one another at plane 118, but are preferably slightly separated, by approximately 0.0001 to 0.0003 inch, by balls 58, which are seated in slots 36b, 56b. Balls 58 are urged into the deepest portion of slots 36b, 56b by Belleville spring 49 and by gear separation forces between side gear 24a and pinion gears 28 which urge side gear 24a leftward as viewed in FIG. 10. Belleville spring 49 abuts snap ring 39 disposed in annular groove 34a in side gear 24a, and urges cone clutch element 50b rightward, axially away from snap ring 39 (FIG. 10).

In operation, as electromagnet 60b is activated, axial separation of cone clutch element 50b and side gear 24a is induced as cone clutch element 50b is magnetically pulled to the left against the force of Belleville spring 49 into clutched engagement with casing part 12d through frustoconical surfaces 43 and 55. As seen in FIG. 11C, in response to the initial flow of magnetic flux cone clutch element 50b is pulled to the left relative to stationary plane 118, whereas side gear 24a temporarily maintains its position relative thereto. As cone clutch element 50b and side gear 24a separate axially, ball 58 is caused to rotate along the ramping helical paths of slots 56b, 36b due to the relative rotation between cone clutch element 50b and side gear 24a, as shown in FIG. 11C. As ball 58 rotates further along the helical ramp paths, it induces further axial separation of cone clutch element 50b and side gear 24a. Referring now to FIGS. 10 and 11D, as frustoconical surface 55 of cone clutch element 50b frictionally engages frustoconical surface 43 of the casing, the relative rotation between clutch element 50b and side gear 24a momentarily increases such that ball 58 rides further along the helical paths of slots 56b, 36b. Because the engagement of surfaces 55 and 43 limit further leftward travel of cone clutch element 50b, side gear 24a is forced towards the right away from stationary plane 118 in response to ball 58 riding further along the helical ramp paths of slots 56b, 36b, further compressing Belleville spring 49 and moving against the opposing pinion gear separation forces. The ball and ramp arrangement of the fourth embodiment eliminates the friction between the cam ramp surfaces of the embodiments shown in FIGS. 1–9, thus $\mu_r$ is effectively zero for ball and ramp arrangements. However, it is to be understood that the previously described camming arrangement may be used with the clutch actuating arrangement contained in the fourth embodiment and conversely, ball and ramp arrangements may be substituted for the camming arrangements.

The fourth embodiment also includes second cone clutch element 101 disposed between side gear 100 and casing part 12d (FIG. 10). Cone clutch element 101 is operatively coupled with side gear 100 using conventionally known methods, such as splining, such that cone clutch element 101 and side gear 100 rotate together. The use of second cone clutch element 101 provides additional torque transfer capacity to the present embodiment. When cone clutch element 50b moves to the left as shown in FIG. 10 due to the application of an actuating force, and further relative axial movement is generated between cone clutch element 50b and side gear 24a via the ball and ramp arrangement, axial force is transmitted by side gear 24a through transfer block 82, side gear 100 and cone clutch element 101 along paths 108. Transfer block 82 is disposed about cross pin 32 and adapted to move laterally relative thereto along axis 9. Viz., as seen in FIG. 10, as side gear 24a axially separates from cone clutch element 50b, moving to the right of plane 118 (FIG. 11D), side gear surface 130, which is in sliding engagement with or only slightly separated from surface 132 of transfer block 82, forces transfer block 82 to the right. Surface 134 of the rightwardly moving transfer block, which is in sliding engagement with or only slightly separated from surface 136 of side gear 100, forces gear 100 rightward. Annular surface 138 of side gear 100 abuts surface 140 of cone clutch element 101, which rotates with side gear 100. Cone clutch element 101 is thus driven rightwardly, its surface 105 entering frictional engagement with surface 104 of casing part 12d.

Thus, the force along paths 108 urges cone clutch element 101 to the right as shown in FIG. 10, thereby engaging frustoconical surfaces 105 and 104 to transfer additional frictional torque from casing 12 to axles 21a, 23a splined to side gears 24a, 100, respectively. Therefore, the force along paths 108 in combination with cone clutch element 101 and the casing part 12d increases the torque transfer capacity of differential 10c. Further, the separating forces between pinion gears 28 and side gear 100 are not directly grounded to casing part 12d, instead being applied to cone clutch element 101. Thus, differential 10c is torque sensitive.

FIG. 10 also shows two alternative flange positions 112 and 113 on casing part 12d which may be used to accommodate different ring gear offsets. It is to be understood that either of these two flange positions may be used with any of the described embodiments and that the location of the flange positions as shown are merely illustrative and should not be interpreted as limiting the scope of the present invention.

As in the case of first three embodiments, which use camming arrangements, the geometries of ramp surfaces 36b, 56b and cone clutch element 50b are some of the factors which determine whether the separation forces on ball and ramp arrangement of the fourth embodiment will continue to increase and add force to cone clutch element 50b to fully engage the clutch mechanism or will become reduced to zero, adding nothing to the ability of cone clutch element 50b to engage casing 12. In other words, these geometries determine whether the cone clutch element 50b automatically reaches full engagement when an initiating force is applied or whether the degree of engagement of cone clutch element 50b varies depending on the amount of the actuating force. For the clutch mechanism of differential 10c to fully engage each time an actuating force is applied, the separation forces must continually increase so that cone clutch element 50b experiences the fall range of desired movement.

The necessary relationships between the design elements of cone clutch element 50b and ramp surfaces 36b, 56b are now described with references to FIGS. 11B–D, which show helical slots 36b and 56b relative to stationary plane 118 which is perpendicular to axis 9. As in the case of differentials 10, 10a and 10b, the characteristics of cone clutch member 50b and ball and ramp arrangement 36b, 58, 56b in differential 10c may be chosen to yield a suitable product value for CF×RF. Factors necessary to describe cone factor $CF_1$ of cone clutch element 50b include:

$\mu_{c1}$=coefficient of friction between the frustoconical engagement surfaces 43 and 55;

$\alpha_1$=angle of frustoconical engagement surface 55 from axis 9; and $R_{c1}$=mean radius of frustoconical engagement surface 55 from axis 9.

These variables determine cone factor $CF_1$ of cone clutch element 50b, defined as:

$$CF_1 = (R_{c1} \times \mu_{c1})/\sin \alpha_1.$$

Factors necessary to describe the characteristic of helical ramp surfaces 36b, 56b include:

$\mu_r$=coefficient of friction between ramp surfaces 36b, 56b (essentially zero);

$\phi_a$=angle of ramp surfaces 36b, 56b; and $R_r$=mean radius of ramp surfaces 36b, 56b.

As was angle φ in previously described embodiments, angle $\phi_a$ is measured from a plane perpendicular to axis of rotation 9 and indicates the degree of rise in the ramp surfaces. These variables are combined to define the "Ramp Factor," RF, defined as:

$$RF = \frac{1}{Rr[\tan(\phi_a + \text{Arctan}\mu_r)]}.$$

Separation force $F_s$, attributed to the relative rotation of slots 36b and 56b about ball 58 (FIGS. 11B–D), is defined as:

$$F_s = T_r \times RF$$

where Tr is the magnitude of the torque on slots 36b and 56b.

The torque on ramp surface 56b equals the cone torque on primary cone clutch element 50b. Thus, $T_r = T_{c1}$. Finally, the axial force on cone clutch element 50b equals the separation force on ramp surface 56b. This force is equivalent in magnitude to the force on ramp surface 36b, which is transferred through side gear 24a to transfer block 82, to side gear 100 and to secondary cone clutch member 101, the axial force on which is designated $F_{c2}$. Thus, $F_s = F_{c1} = F_{c2}$.

Factors necessary to describe the characteristics of secondary cone clutch element 101 include:

$\mu_{c2}$=coefficient of friction between the frustoconical engagement surfaces 104 and 105;

$\alpha_2$=angle of frustoconical engagement surface 105 from axis 9; and $R_{c2}$=mean radius of frustoconical engagement surface 105 from axis 9.

These variables determine cone factor $CF_2$ of cone clutch element 101, defined as:

$$CF_2 = (R_{c2} \times \mu_{c2})/\sin \alpha_2.$$

It is envisioned that CF1 and CF2 would normally be equivalent, although they may differ. The "Secondary Cone Torque," $T_{c2}$, is defined as:

$$T_{c2} = CF_2 \times F_{c2}$$

where $F_{c2}$ is the axial force on cone clutch element 101, equivalent in magnitude to $F_{c1}$. The clutch engagement and disengagement characteristics associated with CF×RF>1 and CF×RF<1 for triggering and sustained external forces $F_e$ discussed above with regard to the third embodiment, differential 10b, also apply to the fourth embodiment, differential 10c. Further, although differential 10c is used with control system 67a, the scope of the present invention should not be construed as being so limited, and control system control system 67 may instead be used to control differential 10c.

Figure 12:
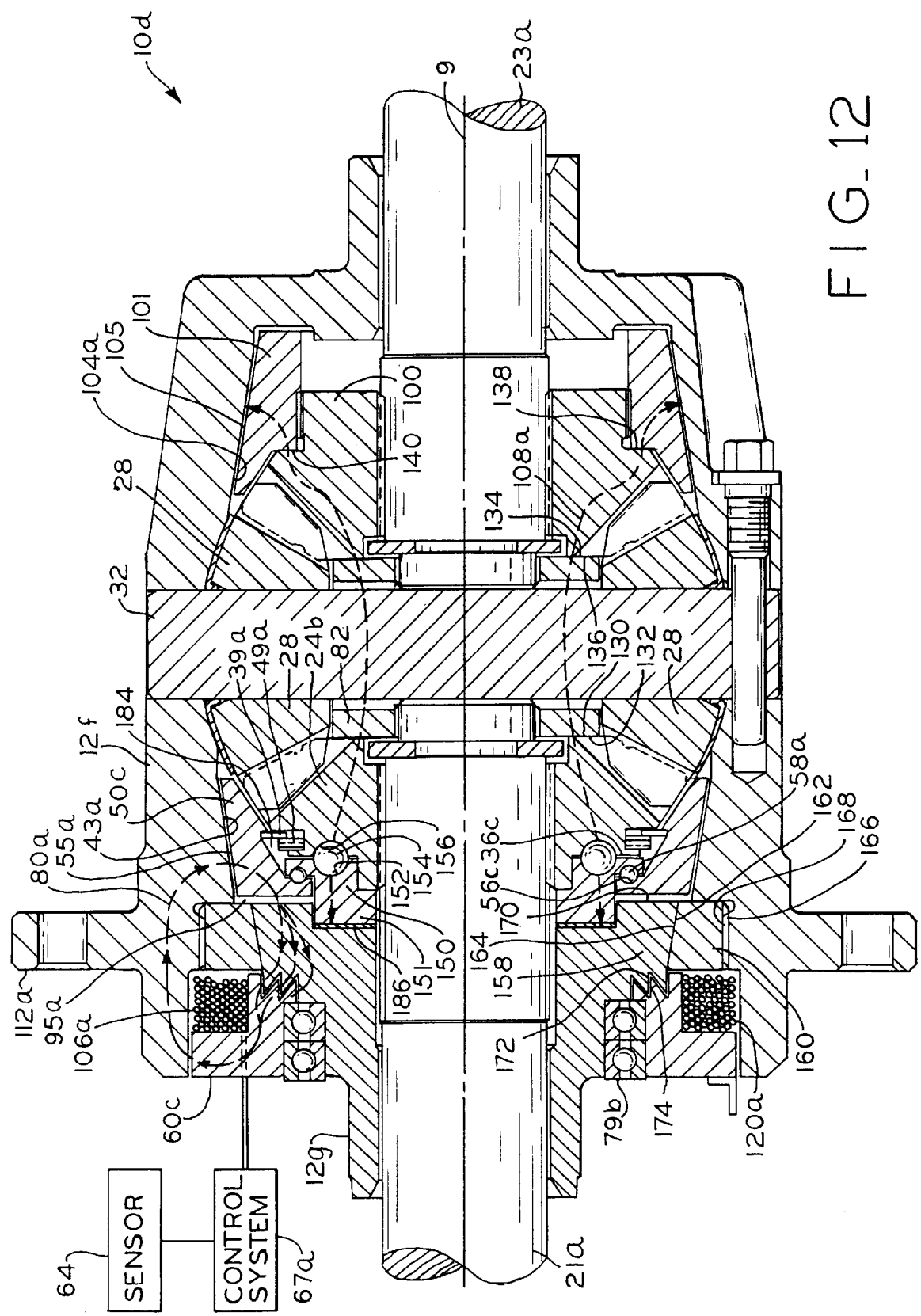
FIG. 12 is a sectional view of a fifth embodiment of the controllable differential of the present invention, including an alternative casing construction for controlling a magnetic flux circuit, ramping mechanism and air gap configuration.

FIG. 12 shows differential 10d, a fifth embodiment of the present invention. The fifth embodiment includes two primary differences from the fourth embodiment, differential 10c (FIG. 10). First, differential 10d comprises first ball and ramp arrangement 36c, 58a, 56c which is associated with the engagement of primary cone clutch element 50c with interior surface 43a of casing part 12f, and a second ball and ramp arrangement 152, 154, 156 which is associated with the engagement of secondary cone clutch element 101 with interior surface 104a of casing part 12f. Second, differential 10d comprises endcap 12g which includes hub portion 158, which is made of a suitable ferromagnetic material, and annular outer portion 160, which is made of a nonmagnetic material. Endcap portions 158 and 160 may comprise separate powdered metal elements made, respectively, of magnetic and nonmagnetic materials, the elements interfitted together by abutting mating frustoconical surfaces 162, 164 prior to sintering, which attaches the endcap portions together.

Alternatively, the unsintered powdered metal elements of magnetic endcap portion 158 may be employed to form part of the mold for nonmagnetic endcap portion 160. Thus, magnetic portion 158 may define, in part, the configuration of nonmagnetic portion 160, that part being the surface of nonmagnetic portion 160 which interfaces magnetic portion 158. In a similar fashion, the unsintered powdered metal element of nonmagnetic endcap portion 160 may be employed to form part of the mold for magnetic endcap portion 158, thus defining the surface thereof which interfaces portion 160. In either of these alternatives, the two portions 158, 160 are sintered together to form endcap 12g, and the interfacing surfaces thereof need not be frustoconical.

Further, other alternative embodiments of endcap 12g may comprise machined bar stock portions 158, 160 or separately formed and sintered powdered metal portions 158, 160 which are threadedly attached together, or may comprise machined bar stock portions 158, 160 which are friction or pressure welded together.

In the embodiment shown in FIG. 12, endcap 12g is a powdered metal assembly having central hub portion 158, through which output shaft 21a extends, and annular outer portion 160 having threaded outer periphery 166 which engages mating threaded surface 168 of casing part 12f. Endcap hub portion 158 is constructed of a suitable ferromagnetic material and annular outer portion 160 is constructed of a suitable nonmagnetic or paramagnetic material in order to create the magnetic flux circuit described further below. Endcap portions 158, 160 are joined along mating frustoconical surfaces 162, 164 prior to the endcap being sintered. Central hub portion 158 engages annular outer portion 160 from the right as viewed in FIG. 12, the leftmost inner diameter of outer portion frustoconical surface 164 being smaller than the rightmost inner diameter thereof. Alternatively, as shown in FIG. 13, central hub portion 158a engages annular outer portion 160a from the left, the leftmost inner diameter of outer portion frustoconical surface 164a being larger than the rightmost inner diameter thereof. Either of these arrangements provide, after sintering, a structurally strong endcap. Further, the inside axial surface of either portion may be milled flush to the other portion's inside axial surface, as necessary, to help ensure gap 95a is consistently sized.

As shown in FIG. 12, nonrotating electromagnet 60c is disposed adjacent endcap 12g, supported thereon by bearing 79b. Air gap 120a axially and radially separates the nonrotating electromagnet from rotating casing parts 12f and 12g. Notably, endcap 12g and electromagnet 60c comprise mating sawtooth profiled portions 172, 174, respectively, between which a portion of air gap 120a exists. Sawtooth profiled portion 172 provides a plurality of substantially parallel, cylindrical surfaces radially separated but substantially aligned axially, and a frustoconical surface extending between the axially opposite ends of each adjacent pair of cylindrical surfaces. Similarly, sawtooth profiled portion 174 provides mating cylindrical and frustoconical surfaces parallel to the corresponding surfaces of sawtooth profiled portion 172. This arrangement allows substantial inner axial face tolerances or relative axial movement between the inner and outer races of bearing 79b, for the distance between the corresponding frustoconical surfaces vary substantially while air gap 120a is properly maintained between mating cylindrical surfaces in the sawtooth profile. Thus, bearing 79b may be of lesser precision than otherwise necessary without greatly compromising clutch performance. Alternatively, as shown in FIG. 13, the interfacing surfaces of electromagnet 60d and endcap 12h may have rather smooth, parallel contours, defining air gap 120b.

Referring again to FIG. 12, it can be seen that magnetic circuit 80a is created which moves primary cone clutch element 50c very slightly to the left and reduces the size of air gap 95a when electromagnet 60c is energized. Surface 55a of cone clutch element 50c moves only in the range of 0.001–0.002 inch toward surface 43a of casing part 12f under the influence of the magnetic field, which corresponds to a decrease in air gap 95a of approximately 0.010 inch as primary cone clutch element 50c moves axially toward endcap 12g. The force on element 50c changes with the amount of flux created by electromagnet 60c. When electromagnet 60c is energized by control system 67a supplying variable current levels to coil windings 106, a correspondingly variable level of magnetic flux is generated along path 80a. The magnetic flux travels from electromagnet 60c across air gap 120a, through casing part 12f and primary cone clutch element 50c, across air gap 95a, through ferrous central hub portion 158 of endcap 12g, and back across air gap 120a to electromagnet 60c by way, primarily, of the parallel cylindrical surfaces of mating sawtooth profiled portions 172, 174. Because annular outer portion 160 of endcap 12g is constructed on nonmagnetic or paramagnetic material, the magnetic flux in the materials of high magnetic permeability travels around portion 160. Due to the magnetic flux circuit, cone clutch element 50c is moved to the left as shown in FIG. 12 by the attraction forces between two pairs of surfaces, namely, between the interfacing axial surfaces of ferrous endcap central hub portion 158 and element 50c, between which air gap 95a is located, and frustoconical clutch surfaces 43a and 55a. As explained above with respect to the fourth embodiment, the degree to which primary cone clutch element 50c of the fifth embodiment is drawn to the left depends on the strength of the magnetic flux field generated by coil winding 106a.

Disposed between primary cone clutch element 50c and side gear 24b is annular cam plate 150, which has axially extending portion 151 which abuts thrust washer 186 adjacent endcap 12g. The actuation sequence created by the momentary difference in rotational speed between primary cone clutch element 50c and cam plate 150 as frustoconical surfaces 43a and 55a seat against each other is similar to that of the fourth embodiment. The variable coil current induces a variable amount of magnetic clamping force between casing part 12f and primary cone clutch element 50c, which induces a variable amount of torque to be exerted by casing part 12f on element 50c. Ball and ramp arrangement 36c, 58a, 56c is comprised of a first plurality of paired spiral slots 36c, 56c located in interfacing surfaces 176, 178 (FIGS. 14–16) of cam plate 150 and primary cone clutch element 50c, respectively, in a manner similar to that described with respect to the fourth embodiment, differential 10c. Slots 36c, 56c define a helically ramping path followed by ball 58a, which may be steel, disposed in each slot pair, the ramp angle defined as angle $\phi_b$ (FIG. 15), which corresponds to ramp angle $\phi_a$ of the fourth embodiment (FIG. 11D).

Referring to FIG. 14 in particular, with electromagnet 60c de-energized, surfaces 176, 178 are closely adjacent and on opposite sides of 118a, which is stationary relative to the differential, perpendicular to axis 9 and parallel to surfaces 176, 178. Surfaces 176, 178 may barely contact one another, but are preferably separated by approximately 0.0001 to 0.0003 inch by balls 58a, which are seated in the deepest portion of slots 36c, 56c by Belleville spring 49a, which acts on surface 180 of groove 182 in side gear 24b and on snap ring 39a, disposed in large diameter base 183 of frustoconic recess 184 inside cone clutch element 50c. Surface 176 of cone clutch element 50c is maintained in position relative to plane 118a when differential 10d is in its unclutched state by Belleville spring 49a urging snap ring 39a, and thus cone clutch element 50c, toward cam plate 150, each ball 58a assuming a centered position between its respective pair of ramping surfaces 36c, 56c. Surface 178 of cam plate 150 is maintained in position relative to plane 118a when differential 10d is in its unclutched state by gear separation forces between pinion gears 28 and side gear 24b, which are transferred to cam plate 150 through balls 154, disposed in slots 152, 156 provided in interfacing surfaces 188, 190, urging cam plate 150 against annular thrust washer 186 (FIG. 12) disposed adjacent endcap 12g.

Interfacing surfaces 188, 190 of side gear 24b and cam plate 150, respectively, are closely adjacent and on opposite sides of plane 192 when differential 10d is in its unclutched state. Surfaces 188, 190 may barely contact each other in this state, but are preferably separated by approximately 0.0001 to 0.0003 inch by balls 154, which are seated in slots 154, 156. In the unclutched state, balls 154 are urged into the deepest portion of slots 154, 156 by Belleville spring 49a. Plane 192 is parallel to plane 118a and moves along axis 9 with the centers of balls 154. Second ball and ramp arrangement 152, 154, 156 is comprised of a second plurality of paired spiral slots 152, 156 located in interfacing surfaces 188, 190 in a manner similar to that described with respect to first ball and ramp arrangement 36c, 58a, 56c. Each pair of slots 152, 156 defines a helically ramping path followed by ball 154, which may be steel, disposed in the slot pair. The ramp angle defined as angle $\theta$ (FIG. 16) is substantially less than angle $\phi_b$. That angle $\theta$ is "shallower" than angle $\phi_b$ means that ball 154 is able to transfer greater axially directed loads than ball 58a. Thus, ball 154 is substantially larger in diameter than ball 58a, providing a greater contact area with slots 152, 156 than ball 58a has with slots 36c, 56c, maintaining stresses associated with the higher loads at acceptable levels. As will be further described below, ball and ramp arrangement 152, 154, 156 transfers axial forces between cam plate 150, which abuts thrust washer 186 at endcap 12g, and side gear 24, which communicates with transfer block 82, side gear 100, secondary cone clutch element 101 and surface 104a of casing part 12f.

In operation, as electromagnet 60c is activated, axial separation of primary cone clutch element 50c and cam plate 150 is induced as cone clutch element 50c is magnetically pulled to the left, as viewed in FIG. 12, against the force of Belleville spring 49a into clutched engagement with casing part 12f through frustoconical surfaces 43a and 55a. As seen in FIG. 15, in response to the initial flow of magnetic flux, cone clutch element 50c is pulled to the left relative to stationary plane 118a and surfaces 43a and 55a abut, entering frictional engagement. As primary cone clutch element 50c and cam plate 150 separate axially, ball 58a is caused to rotate along the ramping helical paths of slots 56c, 36c due to the relative rotation between element 50c and cam plate 150, as shown in FIG. 15. Cam plate 150, urged against thrust washer 186 by the force of Belleville spring 49a and gear separation forces between pinion gears 28 and side gear 24b, maintains its axial position relative to plane stationary 118a. As ball 58a rotates further along the helical ramp paths, frustoconical surfaces 43a, 55a are forced into tighter frictional engagement and cam plate 150, still abutting thrust washer 186, reaches the end of its rotational travel relative to cone clutch member 50c.

Once cam plate 150 reaches its end of travel relative to primary cone clutch member 50c, side gear 24b begins to rotate relative to cam plate 150. Referring to FIG. 16, relative rotation of side gear 24b and cam plate 150 causes ball 154 to rotate along the ramping helical paths of slots 152, 156, as shown by the increased displacement of plane 192, which axially follows the centerline of ball 154, from surfaces 188, 190. As viewed in FIG. 12, side gear 24b moves towards the right, forcing secondary cone clutch element 101 into abutment with casing part 12f via transfer block 82 and side gear 100 in the manner described above with respect to the fourth embodiment shown in FIG. 10. As surfaces 104a, 105 engage, side gear 24b reaches its end of travel, rotationally and axially, relative to cam plate 150. As ball 154 becomes more tightly compressed between slots 152, 154, force is transferred along lines 108a between endcap 12g, thrust washer 186, cam plate 150, ball 154, side gear 24b, transfer block 82, side gear 100, cone clutch member 101 and casing part 12f. Because angle θ of slots 152, 156 (FIG. 16) is smaller than angle $\phi_b$ of slots 36c, 56c (FIG. 15), a greater engagement force is exerted on secondary cone clutch element 101 than on primary cone clutch element 50c. It is estimated that 80 percent of the total torque transfer between casing 12 and axles 21a, 23a is provided by the engagement of secondary clutch surfaces 104a, 105, and only 20 percent by the engagement of primary clutch surfaces 43a, 55a. The ball and ramp camming arrangement of the fifth embodiment eliminates the friction between the sliding cam ramp surfaces in the camming arrangements of the embodiments shown in FIGS. 1–9. However, it is to be understood that the camming arrangement of the fifth embodiment may comprise slidably engaging ramp surfaces in place of the first and/or second ball and ramp arrangements.

As in the case of the fourth embodiment, differential 10c, which comprises a single ball and ramp arrangement, the geometries and frictional characteristics of first ball and ramp arrangement 36c, 58a, 56c and second ball and ramp arrangement 152, 154, 156 of differential 10d determine whether the separation forces on the ball and ramp arrangements will continue to increase and add force to primary and secondary cone clutch elements 50c and 101, respectively, or become reduced to zero upon the de-energizing of the electromagnet. In other words, these geometries determine whether the cone clutch elements 50c and 101 automatically reach fill engagement when external force $F_e$ is applied or whether the degree of engagement of the cone clutch elements varies depending on the amount of the external force.

The necessary relationships between the design elements of primary cone clutch element 50c and first ball and ramp arrangement 36c, 58a, 56c are now described with references to FIG. 14, which shows ball and ramp arrangement 36c, 58a, 56c laid out on stationary plane 118a, which is perpendicular to axis 9. As in the embodiments discussed above, the characteristics of primary cone clutch member 50c and first ball and ramp arrangement 36c, 58a, 56c, and secondary cone clutch member 101 and second ball and ramp arrangement 152, 154, 156 in differential 10d may be chosen to yield a suitable product values for CF×RF for each ball and ramp arrangement. Factors necessary to describe cone factor $CF_1$ of primary cone clutch element 50c include:

$\mu_{c1}$=coefficient of friction between the frustoconical engagement surfaces 43a and 55a;

$\alpha_1$=angle of frustoconical engagement surface 55a from axis 9; and $R_{c1}$=mean radius of frustoconical engagement surface 55a from axis 9. Cone factor $CF_1$ of primary cone clutch element 50c is defined as:

$$CF_1 = (R_{c1} \times \mu_{c1})/\sin \alpha_1.$$

Factors necessary to describe the characteristics of helical ramp surfaces 36c, 56c of the first ball and ramp arrangement include:

$\mu_{r1}$=coefficient of friction between ball 58a and ramp surfaces 36c, 56c (essentially zero);

$\phi_b$=angle of ramp surfaces 36c, 56c; and $R_{r1}$=mean radius of ramp surfaces 36c, 56c from axis of rotation 9.

As are angles $\phi$ and $\phi_a$ in previously described embodiments, angle $\phi_b$ is measured from a plane perpendicular to axis of rotation 9 and indicates the degree of rise in the ramp surfaces. These variables are combined to define primary ramp factor $RF_1$:

$$RF_1 = \frac{1}{R_{r1}[\tan(\phi_b + \operatorname{Arctan} \mu_{r1})]}.$$

Primary separation force $F_{s1}$, associated with the relative rotation of slots 36c and 56c about ball 58a (FIGS. 14–16), is defined as:

$$F_{s1} = T_{r1} \times RF_1$$

where $T_{r1}$ is the magnitude of the torque on slots 36c and 56c and thus on cam plate 150 and primary cone clutch element 50c, respectively.

Factors necessary to describe the characteristics of helical ramp surfaces 152, 156 of the second ball and ramp arrangement include:

$\mu_{r2}$=coefficient of friction between ball 154 and ramp surfaces 152, 156 (essentially zero);

θ=angle of ramp surfaces 152, 156; and $R_{r2}$=mean radius of ramp surfaces 152, 156 from axis of rotation 9.

As is angle $\phi_b$, angle θ is measured from a plane perpendicular to axis of rotation 9 and indicates the degree of rise in the ramp surfaces. These variables are combined to define secondary ramp factor $RF_2$:

$$RF_2 = \frac{1}{R_{r2}[\tan(\theta + \operatorname{Arctan} \mu_{r2})]}.$$

Secondary separation force $F_{s2}$, associated with the relative rotation of slots 152 and 156 about ball 154 (FIGS. 14–16), is defined as:

$$F_{s2} = T_{r2} \times RF_2$$

where $T_{r2}$ is the magnitude of the torque on slots 152, 156 and thus on cam plate 150 and side gear 24b. Because secondary ramp factor $RF_2$ is greater than primary ramp factor $RF_1$, secondary separation force $F_{s2}$ is greater than primary separation force $F_{s1}$, thus ensuring cam plate portion 151 is maintained in abutting relationship to thrust washer 186, and is transferred through side gear 24b to transfer block 82, to side gear 100 and to secondary cone clutch member 101, the axial force on which is designated $F_{c2}$. Thus, $F_{s2} = F_{c2}$. Factors necessary to describe cone factor $CF_2$ of secondary cone clutch element 101 include:

$\mu_{c2}$=coefficient of friction between the frustoconical engagement surfaces 104 and 105;

$\alpha_2$=angle of frustoconical engagement surface 105 from axis 9; and $R_{c2}$=mean radius of frustoconical engagement surface 105 from axis 9. Cone factor $CF_2$ of secondary cone clutch element 101 is defined as:

$$CF_2=(R_{c2} \times \mu_{c2})/\sin \alpha_2.$$

It is envisioned that $CF_1$ and $CF_2$ would normally be equivalent, although they may differ. Secondary cone torque $T_{c2}$ is defined as:

$$T_{c2}=CF_2 \times F_{c2}$$

where $F_{c2}$ is equivalent to $F_{s2}$, as indicated above.

Moreover, upon clutch actuation, the force of cam plate 150 against thrust washer 186 imparts a torque, $T_{tw}$, on the cam plate defined as follows:

$$T_{tw}=F_{tw} \times TWF,$$

where $F_{tw}$ is the axial force on thrust washer 186 and TWF is the thrust washer factor, defined as:

$$TWF=\mu_{tw} \times R_{tw},$$

where $\mu_{tw}$=the lowest coefficient of friction between the thrust washer and an abutting surface; and $R_{tw}$=mean radius of the thrust washer.

In the differential's unclutched state, $F_{tw}$ equals the gear separation force and $T_{tw}$ serves to increase the time delay between the point where clutch surfaces 43$a$, 55$a$ engage and ball 58$a$ reaches its end of travel in slots 36$c$, 56$c$, thus providing smoother overall clutch engagement. If a needle roller washer is used for thrust washer 186, $\mu_{tw}$, and thus $T_{tw}$, are essentially zero, allowing the differential to more quickly return to its normal, open state when the electromagnet is de-energized.

For each of first and second ball and ramp arrangements in the fifth embodiment, differential 10$d$, the above-discussed clutch engagement and disengagement characteristics associated with CF×RF>1 and CF×RF<1 for triggering and sustained external forces $F_e$ also apply.

While this invention has been described as having an exemplary design, the present invention may be further modified within the spirit and scope of this disclosure. This application is therefore intended to cover any variations, uses, or adaptations of the invention using its general principals. Further, this application is intended to cover such departures from the present disclosure as come within known or customary practice in the art to which this invention pertains.

What is claimed is:

1. A controllable differential, comprising:

a rotatable casing;

a pinion gear rotatably supported in said casing;

a side gear rotatably supported in said casing, said side gear meshingly engaged with said pinion gear;

an output element disposed in said casing and coupled to said side gear;

a clutch disposed between said side gear and said rotatable casing, said clutch adapted to transfer torque between said rotatable casing and said side gear, said clutch comprising a cone clutch element having a first frustoconical engagement surface, an insert having a second frustoconical engagement surface, and biasing means adapted to resist axial movement of said cone clutch element and said insert, said cone clutch element disposed between said side gear and said insert, said first frustoconical engagement surface adapted to frictionally engage said second frustoconical engagement surface; and an electrically actuated actuator adapted to apply an initiating force to said clutch in response to the sensed presence of a differentiation condition between said casing and said side gear, said cone clutch element and said insert axially move a predetermined distance in response to the application of said initiating force, whereby said clutch transfers a predetermined amount of torque between said rotatable casing and said side gear in response to said initiating force.

2. The differential of claim 1, wherein said side gear includes a first camming portion having first ramp surfaces, and said clutch includes a second camming portion having second ramp surfaces operatively associated with said first ramp surfaces, said first and second ramp surfaces interacting with each other in response to said initiating force to provide an axial separation force whereby said clutch moves axially a predetermined distance with respect to said side gear.

3. The differential of claim 1, wherein said biasing means comprises a first biasing element disposed in said rotatable casing and abutting said cone clutch element and said side gear, and a second biasing element disposed between said rotatable casing and said insert.

4. The differential of claim 3, wherein said actuator comprises an electromagnet and a sensor adapted to sense a differentiation condition between said side gear and said pinion gear, said electromagnet operatively connected to said sensor, said electromagnet adapted to apply said initiating force to said cone clutch element in response to the presence of a differentiation condition of said side gear and said pinion gear.

5. The differential of claim 3, wherein said actuator comprises a electromagnet and a sensor adapted to sense a rotational condition between said side gear and said rotatable casing, said electromagnet operatively connected to said sensor, said electromagnet adapted to apply said initiating force to said cone clutch element in response to the presence of a predetermined rotational condition of said side gear and said rotatable casing.

6. The differential of claim 1, wherein said actuator comprises a first actuator element disposed inside said rotatable casing and coupled to said clutch, said first actuator element also operatively coupled to a second actuator element disposed outside said rotatable casing through an opening of said rotatable casing whereby an axial movement of said second actuator element produces a corresponding axial movement of said first actuator element, and an electromagnet disposed adjacent said second actuator element, said electromagnet stationary with respect to said rotatable casing, whereby said electromagnet is adapted to apply said initiating force to said second actuator element to thereby initiate a movement of said clutch.

7. The differential of claim 6, wherein said side gear includes a first camming portion having first ramp surfaces, said clutch includes a second camming portion having second ramp surfaces operatively engaging said first ramp surfaces, said first and second ramp surfaces interacting with each other in response to said initiating force to provide an axial separation force whereby said clutch moves axially a predetermined distance with respect to said side gear.

8. The differential of claim 1, wherein said actuator comprises an electromagnet disposed adjacent said rotatable casing and a magnetic flux circuit assembly extending through said rotatable casing and disposed adjacent said electromagnet and said clutch, said electromagnet stationary with respect to said rotatable casing, whereby energization of said electromagnet produces a magnetic flux field which travels through said rotatable casing, said clutch and said magnetic flux circuit assembly to apply said initiating force to said clutch.

9. The differential of claim 8, further comprising a second side gear rotatably supported in said rotatable casing and engaged with said pinion gear, and a second clutch disposed between said second side gear and said rotatable casing, said second side gear operatively coupled with said side gear through a transfer block, wherein axial force on said side gear is transmitted to said second side gear and said second clutch through said transfer block to engage said second clutch with said rotatable casing.

10. A controllable differential, comprising:
a rotatable casing;
a pinion gear rotatably supported in said rotatable casing;
a side gear rotatably supported in said casing and coupled to an output element, said side gear meshingly engaged with said pinion gear;
a cone clutch element disposed between said side gear and said rotatable casing, said cone clutch element having a frustoconical engagement surface to frictionally engage said rotatable casing to thereby transfer torque between said rotatable casing and said side gear in response to an application of an actuating force on said clutch;
an electrically actuated actuator adapted to apply said actuating force to said clutch in response to a predetermined rotational condition of said side gear, said clutch transferring an amount of torque in relation to said actuating force; and
a biasing element disposed between said cone clutch element and said side gear, said biasing element adapted to urge said frustoconical engagement surface to disengage from said rotatable casing.

11. The differential of claim 10, wherein said side gear includes a first camming portion having first ramp surfaces, said clutch includes a second camming portion having second ramp surfaces operatively engaging said first ramp surfaces, said first and second ramp surfaces interacting with each other in response to said actuating force to provide an axial separation force whereby said clutch moves axially with respect to said side gear.

12. The differential of claim 10, wherein said actuator comprises an electromagnet and a sensor adapted to sense a rotational condition of said side gear and said pinion gear, said electromagnet operatively connected to said sensor and adapted to apply said actuating force to said cone clutch element in response to the sensed presence of a predetermined rotational condition of said side gear and said pinion gear.

13. The differential of claim 10, wherein said electromagnet is disposed in said rotatable casing and operatively connected to said sensor via a slip ring.

14. The differential of claim 13, wherein said actuator comprises a first actuator element disposed inside said rotatable casing and coupled to said clutch, said first actuator element also operatively coupled to a second actuator element disposed outside said rotatable casing through an opening of said rotatable casing whereby an axial movement of said second actuator element produces a corresponding axial movement of said first actuator element, and an electromagnet disposed adjacent said second actuator element whereby said electromagnet remains stationary with respect to said rotatable casing, said electromagnet adapted to apply said actuating force to said second actuator element to thereby engage said clutch with said rotatable casing.

15. The differential of claim 14, wherein said side gear includes a first camming portion having first ramp surfaces, said clutch includes a second camming portion having second ramp surfaces operatively engaging said first ramp surfaces, said first and second ramp surfaces interacting with each other in response to said actuating force to provide an axial separation force whereby said clutch moves axially with respect to said side gear.

16. A controllable differential, comprising:
a rotatable casing;
a pinion gear rotatably supported in said casing;
a side gear rotatably supported in said casing;
an output element disposed in said casing and coupled to said side gear;
a clutch disposed between an interior surface of said casing and said side gear, said clutch transferring torque between said casing and said side gear;
an electrically-actuated actuator adapted to apply an initiating force to said clutch in response to the sensed presence of a differential condition between said casing and said side gear;
means for translating relative rotational movement between said clutch and said side gear into a force axially separating said clutch and said side gear;
a second side gear;
a second clutch coupled to said second side gear and disposed between said second side gear and said interior surface of said casing; and
a transfer block interposed between and abutting said side gear and said second side gear, whereby said force axially separating said clutch and said side gear is transferred to said second side gear and said second clutch through said transfer block, and torque is transferred between said casing and said second side gear through said second clutch.

17. The differential of claim 16, wherein said translating means comprises a first camming portion having first ramp surfaces, and a second camming portion having second ramp surfaces operatively engaging said first ramp surfaces.

18. The differential of claim 17, wherein said first and second ramp surfaces are in sliding contact.

19. The differential of claim 17, wherein said first and second ramp surfaces are operatively connected through a plurality of balls.

20. A controllable differential, comprising:
a rotatable casing;
a pinion gear rotatably supported in said casing;
a first side gear rotatably supported in said casing and having a camming portion, said first side gear coupled with a first output member;
a second side gear rotatably supported in said casing and coupled with a second output member;
a first clutch engageable with said casing and having a camming portion;
an electrically actuated actuator;
a camming element disposed between and coupling said first side gear and said first clutch, said camming element having a first camming portion and a second camming portion, said first camming portion of said camming element rotatably coupled to said first clutch camming portion, said second camming portion of said camming element rotatably coupled to said first side gear camming portion, said camming element having an axis of rotation;

a second clutch coupled to said second side gear and engageable with said casing;

whereby actuation of said first clutch by said actuator engages said first clutch with said casing, said camming element forcing said second clutch into engagement with said rotating casing; and a transfer block intermediate and in abutting relationship with said first and second side gears.

21. The differential of claim 20, wherein the coupled interaction between said first clutch camming portion and said first camming portion of said camming element generates a force between said first clutch and said casing, said force progressively increasing with increased relative rotation between said first clutch and said camming element.

22. The differential of claim 20, wherein means are provided for engagement of said first clutch with said rotatable casing before said second clutch engages said rotatable casing, upon actuation of said actuator.

23. The differential of claim 20, wherein said camming element comprises means for providing substantially greater axial forces to said second clutch than to said first clutch.

24. The differential of claim 23, wherein when said actuator is actuated, said axial force provided to said second clutch is maintained at a constant level which is a fixed multiple of said axial force provided to said first clutch.

25. The differential of claim 20, wherein said actuator comprises an electromagnet relative to which said casing rotates, said electromagnet generating a generally toroidal magnetic flux path encircling said electromagnet and an annular nonmagnetic portion of said casing, said flux path flowing through magnetic portions of said casing and said first clutch.

26. The differential of claim 25, wherein variable current is provided to said electromagnet in response to sensed differentiation between said casing and said first and second output members, whereby said first and second clutches variably engage said casing.

27. The differential of claim 25, wherein said electromagnet is separated from said casing by an air gap, said air gap defined in part by parallel, spaced radial surfaces and parallel, spaced generally frustoconical surfaces, said surfaces formed in said casing and said electromagnet.

28. The differential of claim 20, wherein said first camming portion of said camming element and said first clutch camming portion comprise a plurality of operably engaged ramp surfaces having an angle ($\phi_b$), and said second camming portion of said camming element and said first side gear camming portion comprise a plurality of operably engaged ramp surfaces having an angle ($\theta$), said angles ($\phi_b$) and ($\theta$) measured relative to a plane normal to said element axis of rotation, said angle ($\phi_b$) greater than said angle ($\theta$).

29. The differential of claim 20, wherein said first camming portion of said camming element is rotatably coupled to said first clutch camming portion by means of a plurality of balls.

30. The differential of claim 20, wherein said second camming portion of said camming element is rotatably coupled to said first side gear camming portion by means of a plurality of balls.

* * * * *